United States Patent
Hsu

(10) Patent No.: US 9,369,645 B2
(45) Date of Patent: Jun. 14, 2016

(54) IMAGE SENSING APPARATUS AND BLACK LEVEL CONTROLLING METHOD THEREOF

(71) Applicant: Novatek Microelectronics Corp., Hsinchu (TW)

(72) Inventor: Wei Hsu, Taoyuan County (TW)

(73) Assignee: Novatek Microelectronics Corp., Hsinchu (TW)

( * ) Notice: Subject to any disclaimer, the term of this patent is extended or adjusted under 35 U.S.C. 154(b) by 109 days.

(21) Appl. No.: 14/106,839

(22) Filed: Dec. 15, 2013

(65) Prior Publication Data

US 2015/0116533 A1    Apr. 30, 2015

(30) Foreign Application Priority Data

Oct. 30, 2013   (TW) .............................. 102139345 A

(51) Int. Cl.
*H04N 5/361*    (2011.01)

(52) U.S. Cl.
CPC ..................................... *H04N 5/361* (2013.01)

(58) Field of Classification Search
CPC ........ H04N 9/735; H04N 5/361; H04N 9/646
See application file for complete search history.

(56) References Cited

U.S. PATENT DOCUMENTS

| | | | |
|---|---|---|---|
| 6,774,942 B1 | 8/2004 | Salcedo et al. | |
| 7,733,391 B2 * | 6/2010 | Nikkanen et al. | 348/246 |
| 7,817,197 B2 | 10/2010 | Noguchi | |
| 8,218,038 B2 | 7/2012 | Dong et al. | |
| 2012/0133803 A1 * | 5/2012 | Lee et al. | 348/243 |

FOREIGN PATENT DOCUMENTS

TW    201121306    6/2011

OTHER PUBLICATIONS

Chun-Lin, "Tips of night exposure and elimination of long exposure noise (I)," http://article.dcview.com/newreadarticle.php?id=7871, Aug. 28, 2009, pp. 1-4.

\* cited by examiner

*Primary Examiner* — Twyler Haskins
*Assistant Examiner* — Padma Haliyur
(74) *Attorney, Agent, or Firm* — Jianq Chyun IP Office

(57) ABSTRACT

An image sensing apparatus and a black level controlling method thereof are provided. The black level controlling method includes following steps. A conversion relationship between analog gain values and offset values is provided. An analog gain value is converted into an analog offset value by using the conversion relationship between analog gain values and offset values. Whether to adjust the analog offset value is decided according to a first optical black data corresponding to a first part of optical black pixels. A digital data offset value is calculated according to a data corresponding a second part of optical black pixels.

31 Claims, 16 Drawing Sheets

IMAGE SENSING APPARATUS AND BLACK LEVEL CONTROLLING METHOD THEREOF

CROSS-REFERENCE TO RELATED APPLICATION

This application claims the priority benefit of Taiwan application serial no. 102139345, filed on Oct. 30, 2013. The entirety of the above-mentioned patent application is hereby incorporated by reference herein and made a part of this specification.

BACKGROUND OF THE INVENTION

1. Field of the Invention

The invention relates to an image processing technology, and more particularly, to an image sensing apparatus and a black level controlling method thereof.

2. Description of Related Art

Generally, when an image is taken by using a digital still camera (DSC) or other image sensing apparatuses, the image taken may still generate noises due to a dark current even without having a light incident on an image sensor. Therein, heat is a major factor causing the dark current. Heat may lead to intensive actions of electrons inside of a chip, and the heated electrons may constantly move to generate a current which forms the so-called dark current. In order to remove the noises caused by the dark current from an image signal, it is required to adjust/control a black level for the image sensing apparatus.

SUMMARY OF THE INVENTION

The invention is directed to a black level controlling method of an image sensing apparatus and an image sensing apparatus, capable of effectively utilizing the information regarding the dark current provided from an optical black area n the pixel array for performing an accurate black level control, thereby providing a more preferable image data to be outputted.

The invention provides a black level controlling method of an image sensing apparatus at least having a pixel array which includes a plurality of optical black pixels and a plurality of active pixels. The black level controlling method of the image sensing apparatus includes following steps. A conversion relationship between analog gain values and offset values is provided. An analog gain value is converted into an analog offset value by using the conversion relationship between analog gain values and offset values. Whether to adjust the analog offset value is decided according to a first optical black data corresponding to a first part of optical black pixels. A digital data offset value is calculated according to a data corresponding to a second part of optical black pixels.

The present invention provides an image sensing apparatus. The image sensing apparatus includes at least one pixel array, an image data reading unit and a black level control unit. Therein, the pixel array includes a plurality of optical black pixels and a plurality of active pixels. The image data reading unit is coupled to the pixel array. The image data reading unit 120 receives an output of the pixel array, and outputs the image data corresponding to the pixel array according to an analog gain value and an analog offset value. The black level control unit is coupled to the image data reading unit. The black level control unit provides the conversion relationship between analog gain values and offset values, and converts an analog gain value into an analog offset value by using the conversion relationship between analog gain values and offset values. The black level control unit decides whether to adjust the analog offset value according to a first optical black data corresponding to a first part of optical black pixels. Thereafter, a digital data offset value is calculated according to a data corresponding a second part of the optical black pixels. Therein, the black level control unit outputs the analog offset value to the image data reading unit, and adjusts the image data outputted by the image data reading unit according to the digital data offset value.

Based on above, an image sensing apparatus and a black level controlling method thereof according to the embodiments of the invention are capable of obtaining the analog offset value through the conversion relationship between analog gain values and offset values, and deciding whether to adjust the analog offset value and calculating the digital data offset value by using the optical black data. Accordingly, the optical black area may be effectively utilized, such that a more accurate black level control may be realized for obtaining a more preferable image data to be outputted.

To make the above features and advantages of the disclosure more comprehensible, several embodiments accompanied with drawings are described in detail as follows.

DESCRIPTION OF THE EMBODIMENTS

Figure 1:
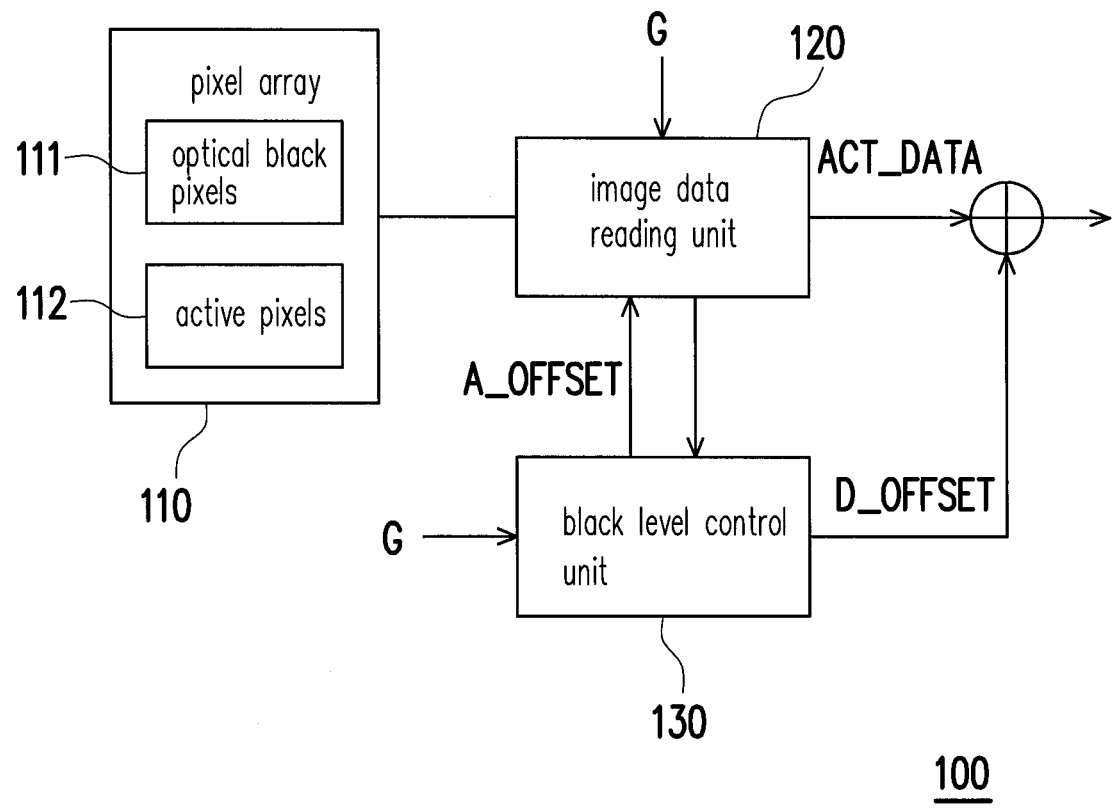
FIG. 1 is a schematic circuit block diagram illustrating an image sensing apparatus according to an embodiment of the invention.

The term "coupling/coupled" used in this specification (including claims) may refer to any direct or indirect connection means. For example, "a first device is coupled to a second device" should be interpreted as "the first device is directly connected to the second device" or "the first device is indirectly connected to the second device through other devices or connection means." Moreover, wherever appropriate in the drawings and embodiments, elements/components/steps with the same reference numerals represent the same or similar parts. Elements/components/steps with the same reference numerals or names in different embodiments may be cross-referenced.

In a black level controlling method of an image sensing apparatus according to embodiment of the invention, an analog offset value is first obtained by using a conversion relationship between analog gain values and offset values, and a black level of an optical black data is preliminary adjusted according to the analog offset value. Thereafter, the analog offset value is fine-tuned according to the adjusted optical black data through a feedback method. Accordingly, a more accurate black level control may be realized for obtaining a more preferable image data to be outputted.

The black level controlling method of the image sensing apparatus according to an embodiment of the invention is described in detail below. Referring to FIG. 1, FIG. 1 is a schematic circuit block diagram illustrating an image sensing apparatus according to an embodiment of the invention. An image sensing apparatus 100 is, for example, a complementary metal oxide semiconductor (CMOS) sensor, a charge coupled device (CCD) sensor, or other image sensors constituted by using arrays of independent pixel sensors, but a type of the image sensing apparatus is not particularly limited in the invention. The image sensing apparatus 100 includes a pixel array 110, an image data reading unit 120 and a black level control unit 130. Therein, the pixel array 110 includes a plurality of optical black pixels 111 and a plurality of active pixels 112. The optical black pixels 111 and the active pixels 112 may be implemented by using a complementary metal oxide semiconductor, a charge coupled device or other technologies.

The active pixels 112 may include, for example, a red (R), a green (G) and a blue (B) pixels, which are configured to receive/sense a light signal of an image. The optical black pixels 111 may be a structure identical or similar to that used by the active pixels, and covered by a light shield layer (e.g., a metal or other blocking layers), so that the optical black pixels 111 is incapable of receiving/sensing the light signal. Since there is no light being irradiated on the optical black pixels 111, an output signal of the optical black pixels 111 shall ideally be a signal level indicating "no light". However, actions of electrons in the pixel array 110 may be more intensive due to heat or other factors. The heated electrons may constantly move to generate a current which forms the so-called dark current. Therefore, a light data sensed by the active pixels 122 may include an actual image data as well as noises from the dark current. The optical black pixels 111 without being irradiated by light may be used to detect the dark current. Arrangements of the optical black pixels 111 and the active pixels 112 are not particularly limited in the present embodiment. For instance, in some embodiments, the optical black pixels 111 may surround/arrange at borders of the pixel array 110 in rows or in columns, or may be located at other positions of the pixel array 110.

Figure 2A:
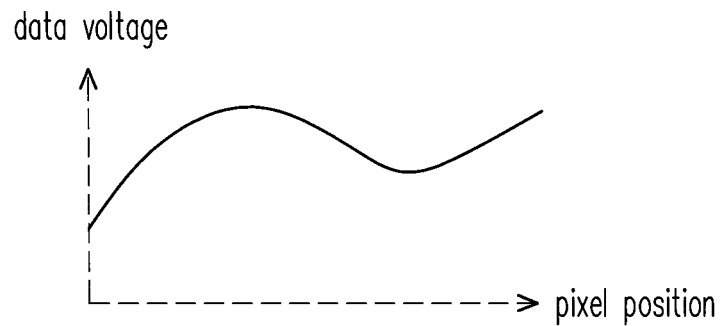
FIGS. 2A to 2E are schematic diagrams illustrating a data voltage distribution sampled from a pixel array according to an embodiment of the invention.
Figure 2B:
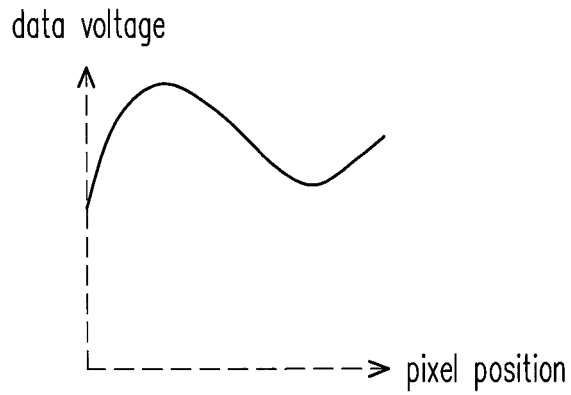
Figure 2C:
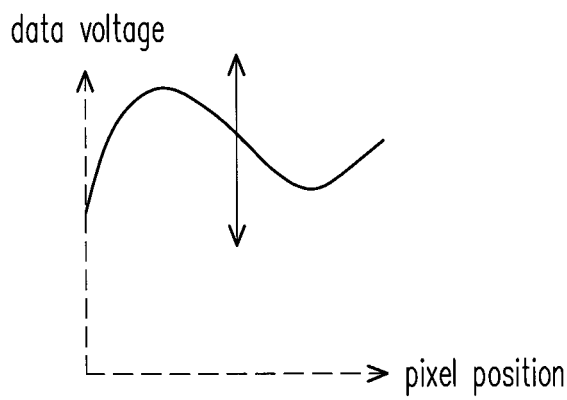

FIGS. 2A to 2E are schematic diagrams illustrating a data voltage distribution sampled from a pixel array according to an embodiment of the invention, in which a vertical axis represents a data voltage and a horizontal axis represents a pixel position. Referring to FIG. 1 and FIG. 2A to FIG. 2E together, the image data reading unit 120 is coupled to the pixel array 110. The image data reading unit 120 receives an output of the pixel array 110 for obtaining an original signal (as shown in FIG. 2A). The image data reading unit 120 may output the image data corresponding to the pixel array 110 according to an analog gain value G and an analog offset value A_OFFSET. For instance, in some embodiments, the image data reading unit 120 may gain an output signal from the pixel array 110 according to the analog gain value G for obtaining a gained signal (as shown in FIG. 2B). The image data reading unit 120 may adjust the gained signal according to the analog offset value A_OFFSET for obtaining an adjusted signal (as shown in FIG. 2C). An arrow in FIG. 2C represents that the image data reading unit 120 may adjust a signal level of the gained signal for obtaining the adjusted signal.

Figure 2D:
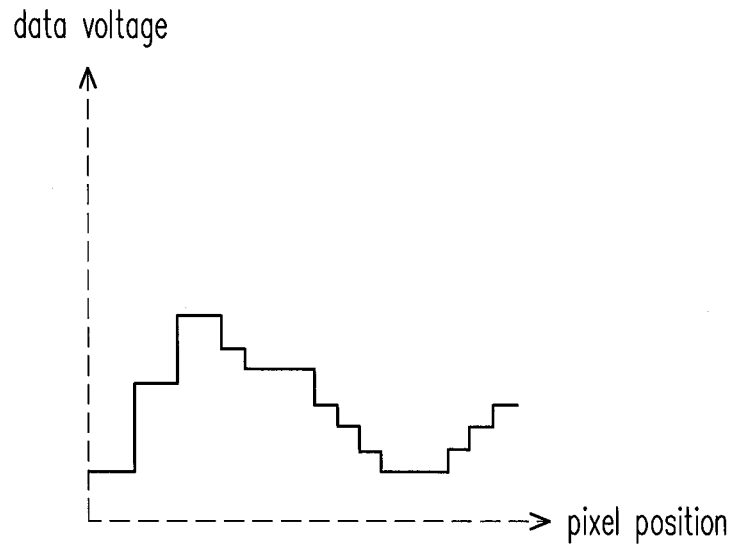

The adjusted signal is in an analog data format. The image data reading unit 120 of the present embodiment may also convert the adjusted signal into the image data in digital form (as shown in FIG. 2D), so as to be used by a rear stage circuit (not illustrated) for an image processing. The black level control unit 130 is coupled to the image data reading unit 120. The black level control unit 130 outputs the analog offset value A_OFFSET to the image data reading unit 120 to control the image data reading unit 120 to adjust offsets of the gained signal. The black level control unit 130 may also calculate a digital data offset value D_OFFSET according to the image data outputted by the image data reading unit 120. According to the digital data offset value D_OFFSET, the black level control unit 130 may also adjust an image data ACT_DATA outputted by the image data reading unit 120 corresponding to the active pixels 112.

Figure 2E:
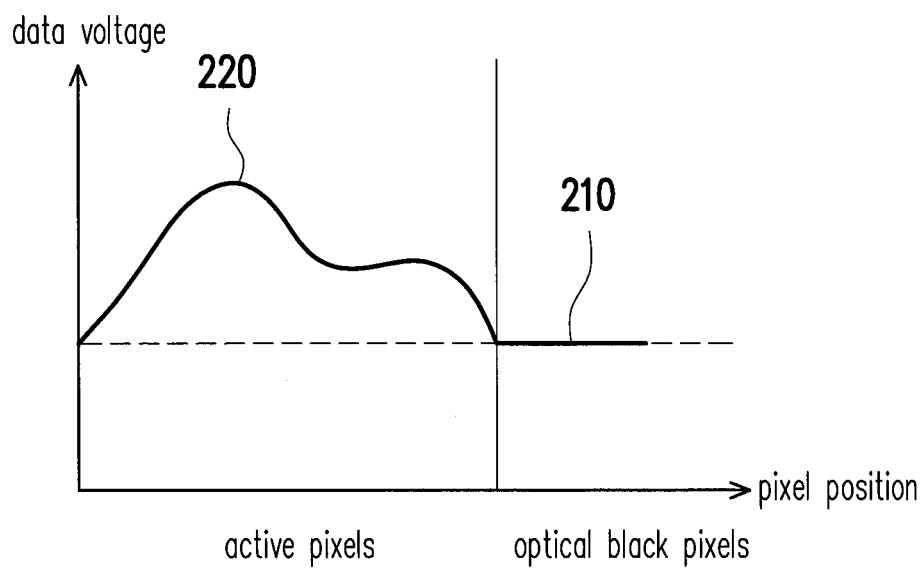

Referring to FIG. 2E which illustrates an example of a data voltage distribution of the optical black pixels 111 and the active pixels 112 sampled form the pixel array 110. In view of above, it can be known that the original signal of the optical black pixels 111 includes the noises from the dark current, and the original signal of the active pixels 112 includes the actual image data and the noises from the dark current. The black level control unit 130 may process the image data of the active pixels 112 by adjusting the analog offset value A_OFFSET and the digital data offset value D_OFFSET, so that the noises form the dark current may be removed. More specifically, as shown in FIG. 2E, an optical black data voltage 210 sampled from the optical black pixels 111 includes the noises from the dark current, and a sensing data voltage 220 (a solid line depicted in FIG. 2E) sampled form the active pixels 112 includes the noises from the dark current (a horizontal dash line depicted in FIG. 2E) and the actual image data voltage. It should be noted that, in case the gained signal is not adjusted in an analog domain, when the data voltage is converted into the digital data, since an analog to digital converter (ADC) is restricted by its voltage conversion range, the noises from the dark current in the image data may cause saturation to occur on a digital output of the image data reading unit 120, resulting loss in parts of the image data.

The lack level control unit 130 may control the image data reading unit 120 by adjusting the analog offset value A_OFFSET, so that the image data reading unit 120 may have a part of the noises from the dark current in the gained signal removed in the analog domain (e.g., reducing a direct current level of the gained signal), so as to prevent the saturation from being occurred on the digital output of the image data reading unit 120. The black level control unit 130 may perform a computation to both the digital data offset value D_OFFSET and the digital output of the image data reading unit 120 through the image processing such as a subtracter technology, so that other parts of the noises from the dark current may be removed in a digital domain. In other words, the image sensing apparatus 100 may adjust the black level in two stages (the analog domain and the digital domain).

Figure 3:
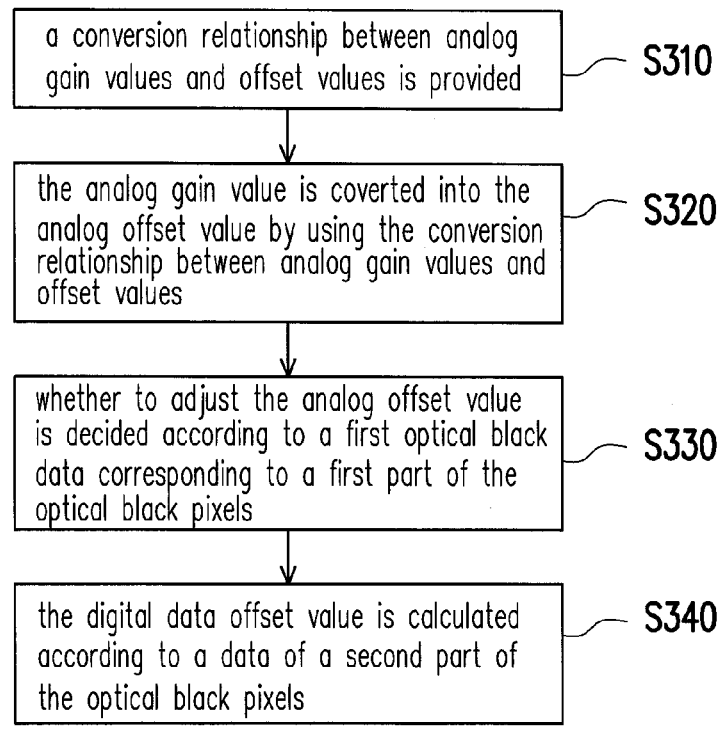
FIG. 3 is a flowchart illustrating a black level controlling method of the image sensing apparatus according to an embodiment of the invention.

FIG. 3 is a flowchart illustrating a black level controlling method of the image sensing apparatus according to an embodiment of the invention. A method of the present embodiment is suitable for the image sensing apparatus 100 of FIG. 1. The following steps are elaborated according to FIG. 3 to describe the method of the present embodiment and detailed operations of the image sensing apparatus 100 and the black level control unit 130 with the reference to each element of the image sensing apparatus 100 depicted in FIG. 1.

Referring to FIG. 1 and FIG. 3, in step S310 the black level control unit 130 may provide "a conversion relationship between analog gain values and offset values". In some embodiments, the conversion relationship between analog gain values and offset values may be a linear equation in two variables, or a polynomial of other powers and/or a combination thereof, which is not particularly limited in the invention. The conversion relationship between analog gain values and offset values may be built in the black level control unit 130 in advance.

In some other embodiments, the image sensing apparatus 100 may respectively read a plurality of sensing data of the optical black pixels 111 by using different analog gain values G for obtaining the conversion relationship between analog gain values and offset values during a start-up calibration period. Therein, during the start-up calibration period, the black level control unit 130 may obtain an analog gain value-to-offset value conversion function to be used as the conversion relationship between analog gain values and offset values, or the conversion relationship between analog gain values and offset values may be obtained according to an analog gain value-to-offset value conversion function and a conversion ratio. An embodiment is provided below for each of above-said circumstances, and served to described implementations of the black level control unit 130 in obtaining the conversion relationship between analog gain values and offset values.

Figure 4:
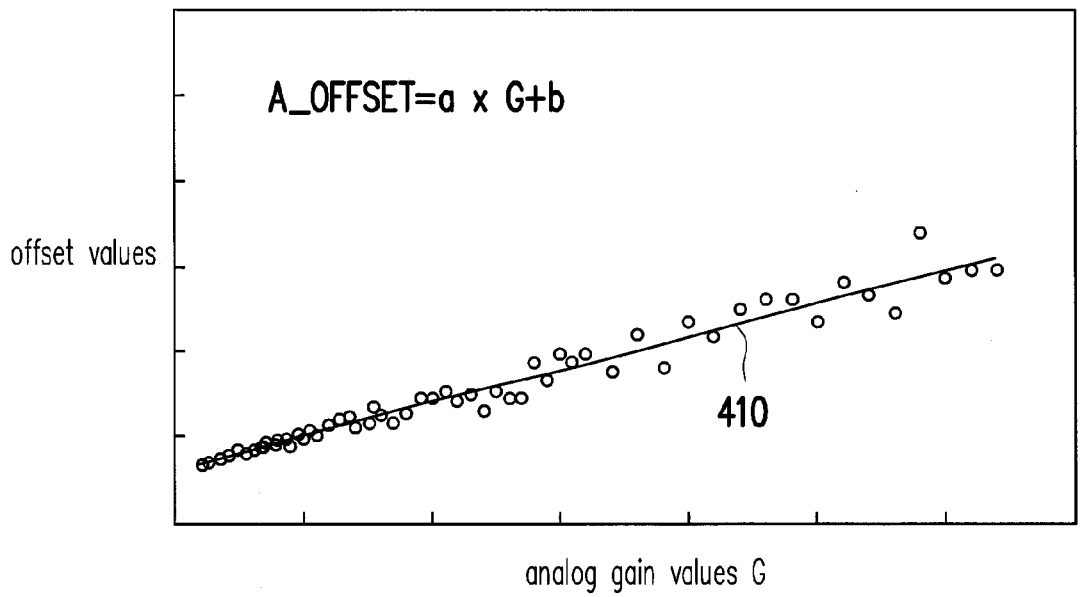
FIG. 4 is an example illustrating a conversion relationship between analog gain values and offset values according to an embodiment of the invention.

In an embodiment of the invention, during the start-up calibration period, the image sensing apparatus 100 is capable of respectively reading the sensing data of the optical black pixels corresponding to the different analog gain values G through the image data reading unit 120, and analyzing the analog gain values and the sensing data of the optical back pixels by using a linear regression through the black level control unit 130 thereby obtaining an analog gain value-to-offset value conversion function to be used as the conversion relationship between analog gain values and offset values. For instance, FIG. 4 is an example illustrating a conversion relationship between analog gain values and offset values according to an embodiment of the invention, in which a vertical axis represents the offset value (the gained data of the optical black pixels), and a horizontal axis represents the analog gain value G. During the start-up calibration period, the image sensing apparatus 100 may provide a plurality of different analog gain values G to the image data reading unit 120, and the optical black pixels may be read by the image data reading unit 120 to obtain a plurality of sensing data corresponding to each of the analog gain values G as shown in FIG. 4 (e.g., as shown by small circles in FIG. 4). Each of the sensing data corresponding to the different analog gain values G may also be a reading result from the same optical black pixel, or an average of the sensing data corresponding to a plurality of optical black pixels. Thereafter, each of the sensing data as depicted in FIG. 4 may be generalized by analyzing of the linear regression, so as to obtain a conversion relationship between analog gain values and offset values 410. The conversion relationship between analog gain values and offset values 410 may be, for example, a linear equation in two variables. For instance, the conversion relationship between analog gain values and offset values 410 may be an Equation 1 as listed below, in which "A_OFFSET" represents the analog offset value, "a" represents a slope, "G" represents the analog gain value and "b" represents an intercept. The black level control nit 130 may generalize the slope a and the intercept b of the conversion relationship between analog gain values and offset values 410 depicted in FIG. 4. Accordingly, after the start-up calibration period is ended, the black level control unit 130 may convert the analog gain value G into the analog offset value A_OFFSET by using the conversion relationship between analog gain values and offset values 410.

$$A\_OFFSET = a*G + b \qquad \text{Equation 1}$$

In other embodiment, in case the conversion relationship between analog gain values and offset values is the polynomial of other powers and/or the combination thereof, the black level control unit 130 may also obtain the conversion relationship between analog gain values and offset values by correspondingly using a polynomial regression or other regression methods of statistics.

It should be noted that, due to influences of processing factors or variations in environment, each of the optical black pixels in the pixel array 110 may be different from one another. Variability between each of the optical black pixels may be considered by using the linear regression. For instance, the intercept b in the conversion relationship between analog gain values and offset values is a parameter that implies information regarding variations between each of the optical black pixels.

Referring to FIG. 1 and FIG. 3, in step S320, the black level control unit 130 converts the analog gain value G into the analog offset value A_OFFSET by using the conversion relationship between analog gain values and offset values obtained in step S310. In the present embodiment, the image sensing apparatus 100 may decide the analog gain value G according to a photosensitivity (ISO) of a frame being previewed. In other embodiments, the analog gain value G may also be a default value built in the image sensing apparatus 100; the analog gain value G may also be a setting value at a previous shut-down; or the analog gain value G may also be a parameter manually selected by a user. A method for deciding the analog gain value G is not particularly limited in the invention.

After the analog gain value G is decided, the black level control unit 130 may convert the analog gain value G into the analog offset value A_OFFSET by using said conversion relationship between analog gain values and offset values. Herein, the black level control unit 130 may have the analog offset value A_OFFSET obtained through the conversion stored into a corresponding register. When the offset values of the image data are adjusted by the image data reading unit 120, the analog offset value A_OFFSET may be outputted from the register of the black level control unit 130 to the image data reading unit 120.

In step S330, the black level control unit 130 may decide whether to adjust the analog offset value A_OFFSET obtained in step S320 according to a first optical black data corresponding to a first part (one or more optical black pixels) of the optical black pixels 111. In some embodiments, the image sensing apparatus 100 may read the sensing data of one optical black pixel among the optical black pixels 111 through the image data reading unit 120 to be sued as the first optical black data. In considering of possible variations between the optical black pixels 111, in some embodiments, the image sensing apparatus 100 may also read the sensing data of a plurality of optical black pixels among the optical black pixels 111 through the image data reading unit 120, and obtain the first optical black data by calculating an average value thereof. After the first optical black data is obtained by the black level control unit 130, the black level control unit 130 may check the first optical black data to decide whether to adjust the analog offset value A_OFFSET. For instance, when a difference between the first optical black data and a target value (e.g., zero or other reference values) is greater than a specific threshold value (e.g., 10 or other reference values), the black level control unit 130 may increase the analog offset value A_OFFSET, so as to reduce the first optical black data. When the difference between the first optical black data and the target value is less than the threshold value, the black level control unit 130 may maintain the current analog offset value A_OFFSET.

In step S340, the black level control unit 130 may calculate the digital data offset value D_OFFSET according to a data corresponding a second part (one or more optical black pixels) of the optical black pixels 111. For instance, in the present embodiment, the image data reading unit 120 may output the sensing data of a remaining part of the optical black pixels 111 to the black level control unit 130 according to the analog offset value A_OFFSET determined in step S330, and the black level control unit 130 may calculate the digital data offset value D_OFFSET according to the sensing data of the remaining part. Herein, the sensing data of the optical black pixels may came form one or more optical black pixels. For instance, the black level control unit 130 may calculate an average value of a plurality of sensing data among the optical black pixels 111, and use the average value as the digital data offset value D_OFFSET. Therein, noises caused by the differences from each of the optical black pixels may be eliminated by reading a plurality of optical black pixels for obtaining the corresponding digital data offset value. The black level control unit 130 may adjust the image data ACT_DATA according to the digital data offset value D_OFFSET.

In view of above, the black level controlling method and the image sensing apparatus 100 proposed by the present embodiment may correct the black level in two stages. In the analog domain, the image data reading unit 120 may perform a rough black level calibration according on the analog offset value A_OFFSET provided by the black level control unit 130, so as to avoid the saturation phenomenon occurred on the image data ACT_DATA. In the digital domain, the black level control unit 130 may perform a fine black level calibration on the analog offset value A_OFFSET by adjusting the digital data offset data D_OFFSET. Therein, the black level control unit 130 may decide the analog offset value A_OFFSET and the digital data offset value D_OFFSET simply by using the sensing data of the part of the optical black pixels 111. Accordingly, the black level controlling method and the image sensing apparatus 100 proposed by the present embodiment may effective utilize the optical black pixels 111 having limited areas, and perform an accurate black level calibration and control.

Figure 5:
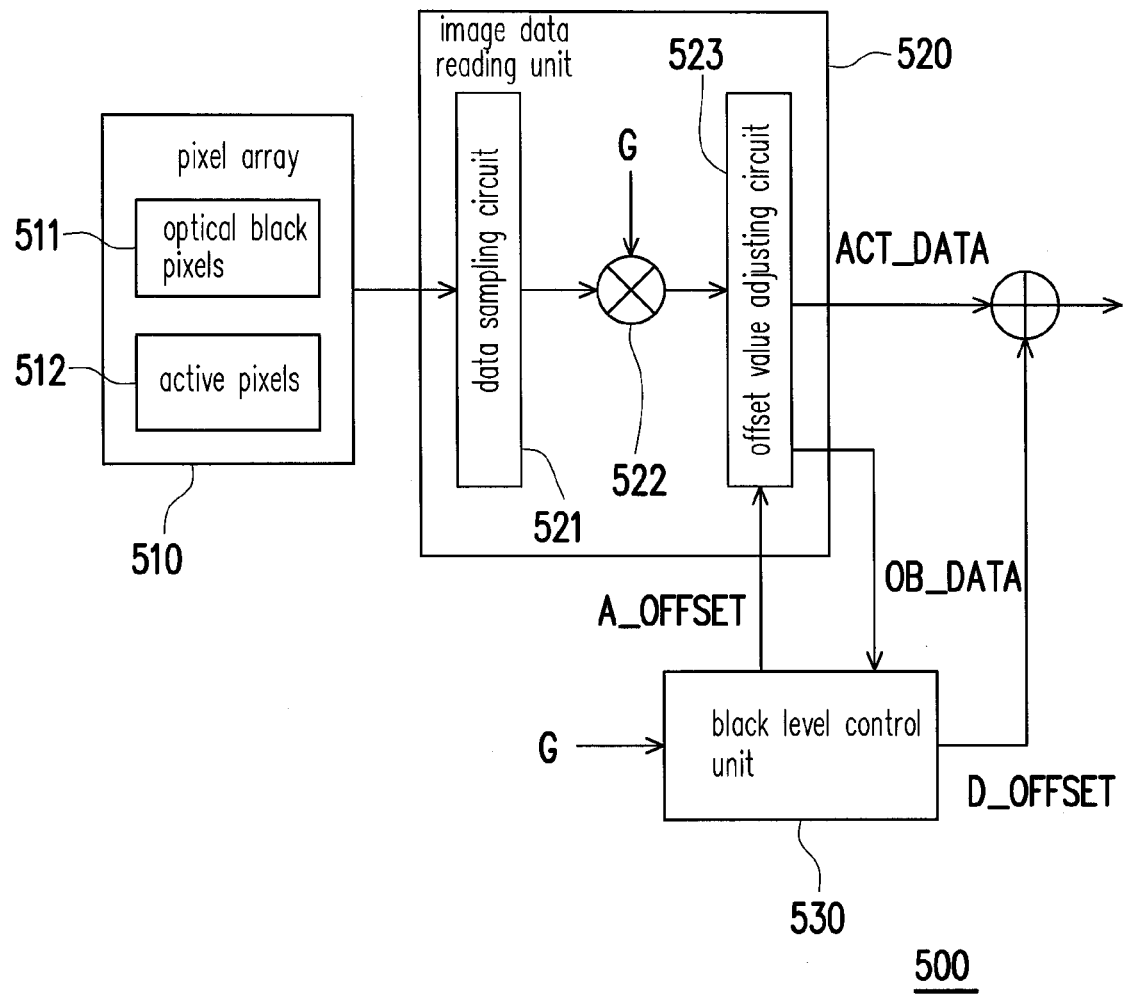
FIG. 5 is a schematic circuit block diagram illustrating an image sensing apparatus according to an embodiment of the invention.

Nonetheless, the implementations of the invention are limited to the foregoing embodiments. For instance, FIG. 5 is a schematic circuit block diagram illustrating an image sensing apparatus according to another embodiment of the invention. An image sensing apparatus 500 depicted in FIG. 5 includes a pixel array 510, an image data reading unit 520 and a black level control unit 530. The pixel array 510 includes optical black pixels 511 and active pixels 512. The image sensing apparatus 500, the pixel array 510, the optical black pixels 511, the active pixels 512, the image data reading unit 520 and the black level control unit 530 as depicted in FIG. 5 may be inferred with reference to related description for the image sensing apparatus 100, the pixel array 110, the optical black pixels 111, the active pixels 112, the image data reading unit 120 and the black level control unit 130 as depicted in FIG. 1. Unlike the embodiment of FIG. 1, the image data reading unit 520 depicted in FIG. 5 includes a data sampling circuit 521, a gain circuit 522 and an offset value adjusting circuit 523.

Referring to FIG. 5, the data sampling circuit 521 is coupled to the pixel array 510, and receiving an output of the pixel array 510 for obtaining an original signal (as shown in FIG. 2A). In some embodiments, the data sampling circuit 521 samples from the pixel array 510, and converts an electric charge data into an analog voltage to be outputted as the original signal. In some embodiments, the pixel array 510 may be integrated with the data sampling circuit 521, so as to directly output the analog voltage to the gain circuit 522. Person who applies the present embodiment may dispose the data sampling circuit 510 correspondingly based on design requirements and features of the pixel array 510, so as to correspondingly obtain the original signal stored in the pixel array 510. The gain circuit 522 is coupled to the data sampling circuit 521 to receive the original signal, and gain the original signal according to the analog gain value G for obtaining a gained signal (as shown n FIG. 2B). The gain circuit 522 is, for example a programmable gain amplifier or amplifiers of other types. Types of elements and circuit architectures in the gain circuit 522 are not particularly limited by the present embodiment.

The offset value adjusting circuit 523 is coupled to the gain circuit 522 to receive the gained signal. The offset value adjusting circuit 523 may adjust the gained signal according to the analog offset value A_OFFSET in the analog domain for obtaining an adjusted signal (as shown in FIG. 2C). The offset value adjusting circuit 523 may further convert the adjusted signal into the image data ACT_DATA in digital form (as shown in FIG. 2D). Accordingly, in the analog domain, the offset value adjusting circuit 523 may perform a rough black level calibration according to the analog offset value A_OFFSET provided by the black level control unit 530, so as to avoid the saturation phenomenon occurred on the image data ACT_DATA.

The offset value adjusting circuit 523 may obtain the optical black data of the optical black pixels 511 through the data sampling circuit 521 and the gain circuit 522. When a difference between the optical black data and a target value (e.g., zero or other reference values) is greater than a specific threshold value (e.g., 15 or other reference values), the black level control unit 530 may increase the analog offset value A_OFFSET to reduce the optical black data. When the difference between the optical black data and the target value is less than the threshold value, the black level control unit 530 may maintain the analog offset value A_OFFSET. When the black level control unit 53 maintains the analog offset value A_OFFSET unchanged, the image data reading unit 520 may output the image data ACT_DATA corresponding to the active pixels 512 according to the analog gain value G and the analog offset value A_OFFSET.

When the analog offset value A_OFFSET is decided by the black level control unit 530, the offset value adjusting circuit 523 may obtain the optical black data of a part (one or more optical black pixels) of the optical black pixels 511 through the data sampling circuit 521 and the gain circuit 522, and provide the optical black data to the black level control unit 530. The black level control unit 530 may calculate the digital data offset value D_OFFSET according to the optical black data of the part of the optical black pixels 511. For instance, the black level control unit 530 may calculate an average value of the optical black data of a plurality of optical black pixels among the optical black pixels 511, and use the average value as the digital data offset value D_OFFSET. The image sensing apparatus 500 may subtract the digital data offset value D_OFFSET from the image data ACT_DATA through a digital processing circuit (e.g., the subtracter) to adjust the black level in the digital domain. Therefore, the black level control unit 530 may perform a fine black level calibration on the image data ACT_DATA in the digital domain by adjusting the digital data offset value D_OFFSET.

Figure 6:
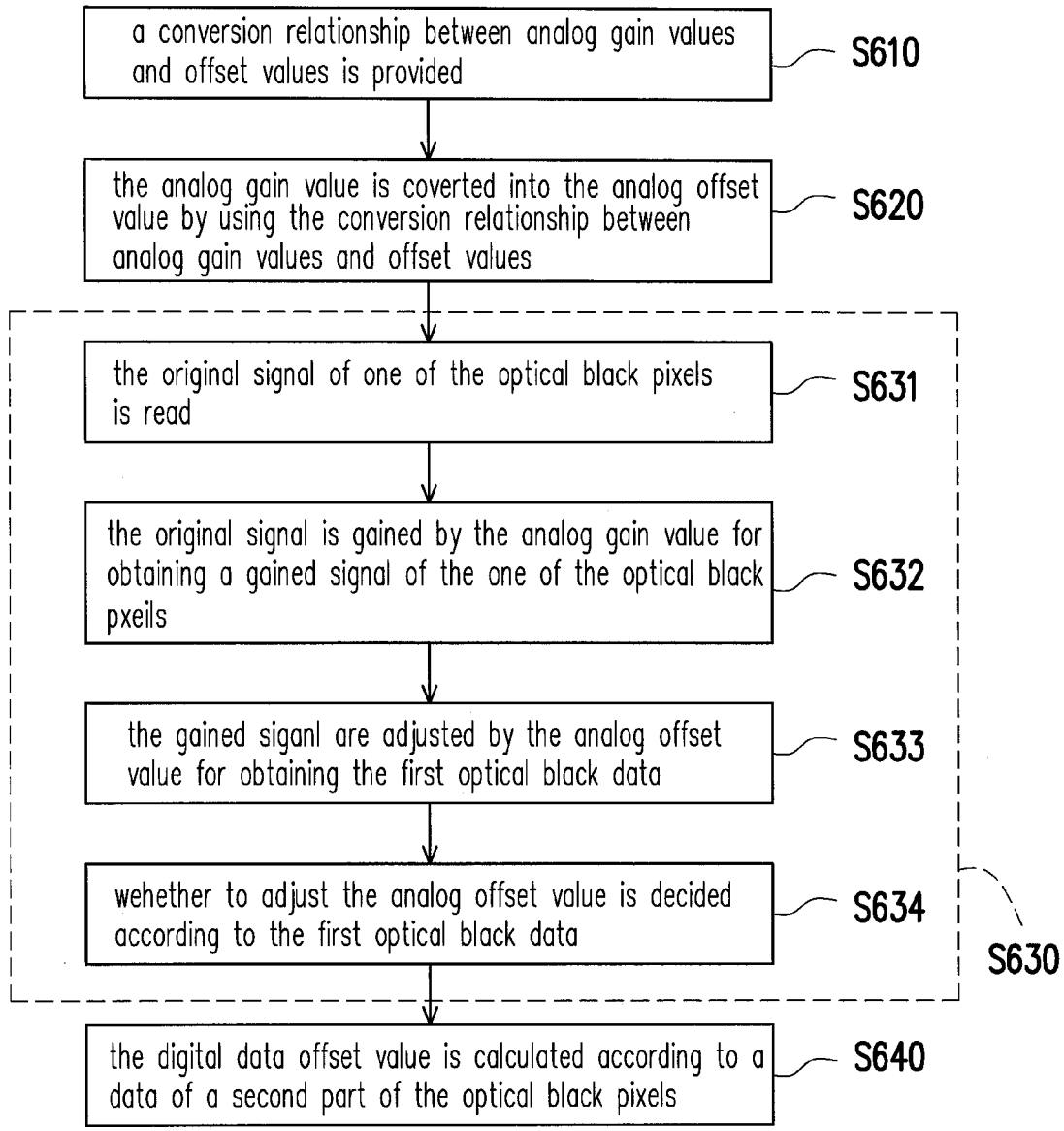
FIG. 6 is a flowchart illustrating a black level controlling method of the image sensing apparatus according to an embodiment of the invention.

FIG. 6 is a flowchart illustrating a black level controlling method of the image sensing apparatus according to another embodiment of the invention. Steps S610, S620, S630 and S640 depicted in FIG. 6 may be inferred with reference to related description for steps S310, S320, S330 and S340 depicted in FIG. 3. Referring to FIG. 5 and FIG. 6, in step S610, the black level control unit 530 provides a conversion relationship between analog gain values and offset values. Next, in step S620, the black level control unit 530 converts the analog gain value G into the analog offset value A_OFFSET by using the conversion relationship between analog gain values and offset values.

In the present embodiment, step S630 includes sub-steps S631 to S634. In step S631, the data sampling circuit 521 of the image data reading unit 520 reads the original signal of a part of the optical black pixels 511 in the pixel array 510. Next, in step S632, the gain circuit 522 gains/amplifies the original signals of the first part outputted by the data sampling circuit 521 by the analog gain value G for obtaining a plurality of gained signals of the part of the optical black pixels 511. Thereafter, in step S633, the offset value adjusting circuit 523 adjusts the gained signal by the analog offset value A_OFFSET. Accordingly, a first optical black data OB_DATA is obtained.

The black level control unit 530 may decide whether to adjust the analog offset value A_OFFSET according to the first optical black data OB_DATA (step S634). Once the analog offset value A_OFFSET is decided by the black level control unit 530, the black level control unit 530 may calculate the digital data offset value D_OFFSET according to a data corresponding a second part of the optical black pixels 511 (step S640).

Figure 7:
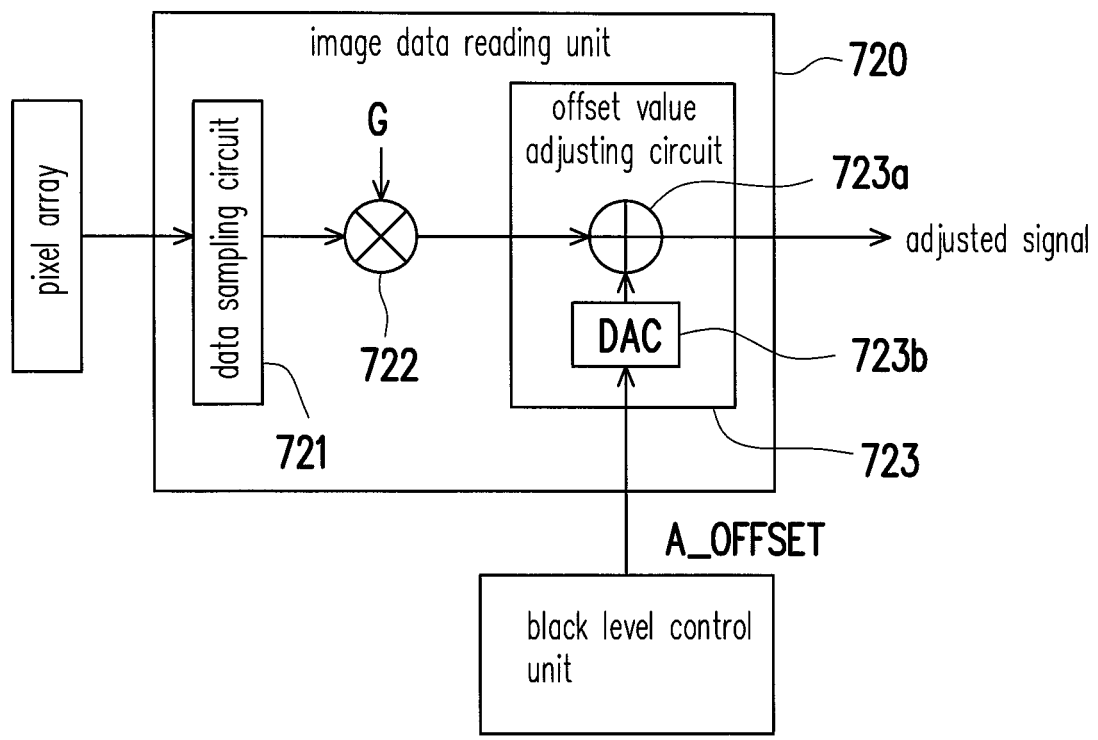
FIG. 7 is a schematic circuit block diagram illustrating an image data reading unit according to an embodiment of the invention.

FIG. 7 is a schematic circuit block diagram illustrating an image data reading unit according to yet another embodiment of the invention. The image data reading unit 720 depicted in FIG. 7 includes a data sampling circuit 721, a gain circuit 722 and an offset value adjusting circuit 723. The image data reading unit 720, the data sampling circuit 721, the gain circuit 722 and the offset value adjusting circuit 723 as depicted in FIG. 7 may be inferred with reference to related description for the image sensing apparatus 100 and the image data reading unit 120 as depicted in FIG. 1, and/or may be inferred with reference to related description for the image sensing apparatus 500, the image data reading unit 520, the data sampling circuit 521, the gain circuit 522 and the offset value adjusting circuit 523 as depicted in FIG. 5. Unlike the embodiment of FIG. 5, the offset value adjusting unit 723 of the image data reading unit 720 depicted in FIG. 7 may include a first computing unit 723a and a digital to analog converter (DAC) 723b.

An input terminal of the DAC 723b is coupled to the black level control unit to receive the analog offset value A_OFFSET from the black level control unit. The DAC 723b may convert the analog offset value A_OFFSET from the digital data format into the analog data format. The DAC 723b may transmit the analog offset value in the analog form to the first computing unit 723a. The first computing unit 723a is coupled to the gain circuit 722 and the DAC 723b. The first computing unit 723a receives the gained signal outputted from the gain circuit 722 and receives the analog offset value A_OFFSET in the analog form from the DAC 723b. The first computing unit 723a may perform calculations on the gained signal and the analog offset value A_OFFSET to obtain an adjusted signal, and output the adjusted signal to a next-stage circuit. For instance, the first computing unit 723a may subtract the analog offset value A_OFFSET from the gained signal, and use a result thereof as the adjusted signal.

Figure 8:
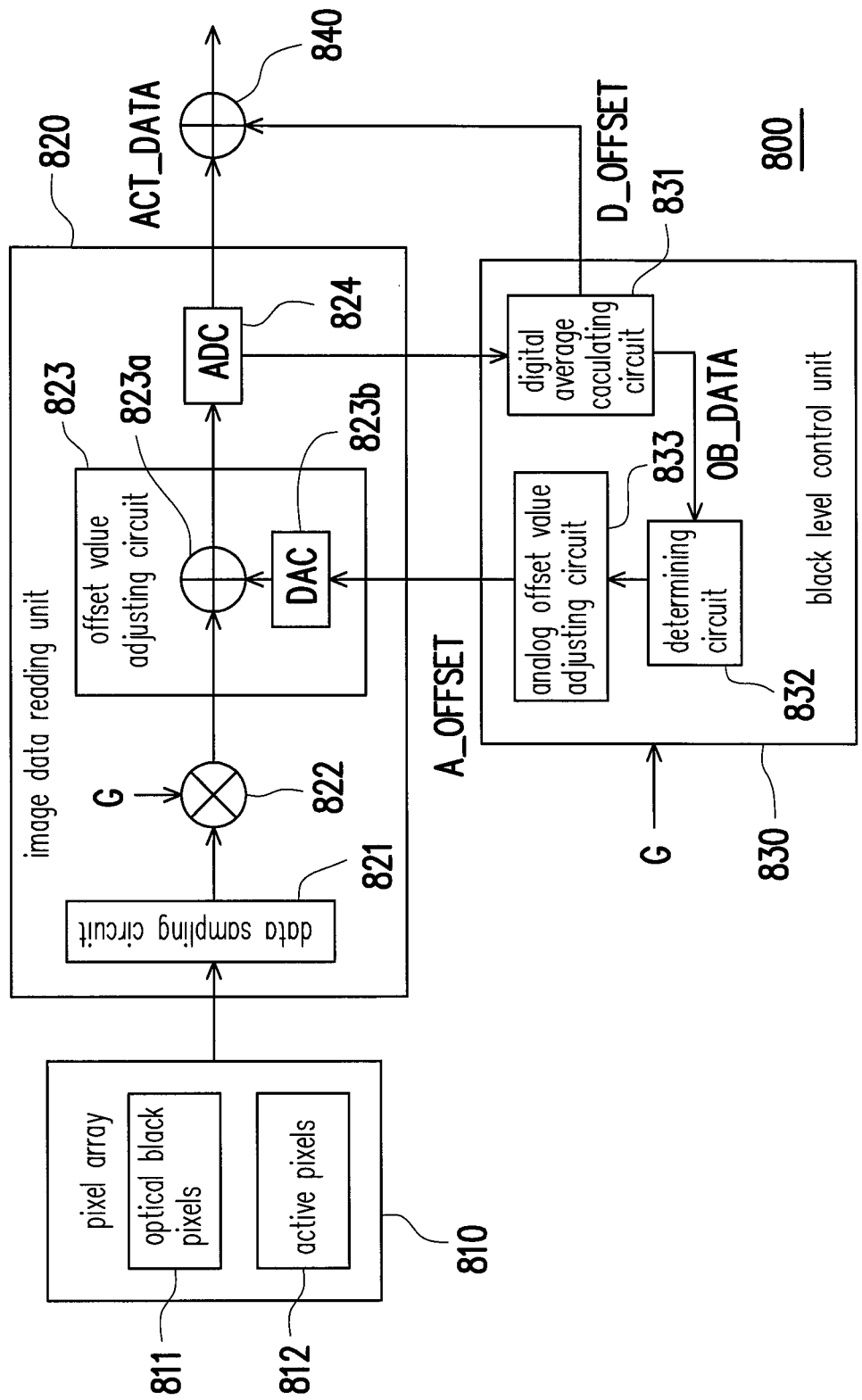
FIG. 8 is a schematic circuit block diagram illustrating an image sensing apparatus according to an embodiment of the invention.

Furthermore, in some other embodiments, the image data reading unit may read a plurality of original signals of a first part of the optical black pixels through the data sampling circuit, and calculate an average value of a plurality of digital data corresponding to the original signal, so as to obtain the first optical black data. For instance, FIG. 8 is a schematic circuit block diagram illustrating an image sensing apparatus according to still another embodiment of the invention. In the present embodiment, an image sensing apparatus 800 depicted in FIG. 8 includes a pixel array 810, an image data reading unit 820 and a black level control unit 830 and a second computing unit 840. The pixel array 810 includes optical black pixels 811 and active pixels 812. The image sensing apparatus 800, the pixel array 810, the optical black pixels 811, the active pixels 812, the image data reading unit 820 and the black level control unit 830 as depicted in FIG. 8 may be inferred with reference to related description for the image sensing apparatus 100, the pixel array 110, the optical black pixels 111, the active pixels 112, the image data reading unit 120 and the black level control unit 130 as depicted in FIG. 1, or may be inferred with reference to related description for the image sensing apparatus 500, the pixel array 510, the optical black pixels 511, the active pixels 512, the image data reading unit 520 and the black level control unit 530 as depicted in FIG. 5.

The image data reading unit 820 depicted in FIG. 8 includes a data sampling circuit 821, a gain circuit 822, an offset value adjusting circuit 823 and an analog to digital converter (ADC) 824. The data sampling circuit 821, the gain circuit 822 and the offset value adjusting circuit 823 as depicted in FIG. 8 may be inferred with reference to related description for the data sampling circuit 521, the gain circuit 522 and the offset value adjusting circuit 523 as depicted in FIG. 5, or may be inferred with reference to related description for the data sampling circuit 721, the gain circuit 722 and the offset value adjusting circuit 723 as depicted in FIG. 7. The offset value adjusting circuit 823 depicted in FIG. 8 includes a first computing circuit 823a and a digital to analog converter (DAC) 823b. The first computing circuit 823a and the DAC 823b depicted in FIG. 8 may be inferred with reference to related description for the first computing unit 723a and the DAC 723b depicted in FIG. 7. Unlike the embodiments of FIG. 5 and FIG. 7, the black level control unit 830 depicted in FIG. 8 includes a digital average calculating circuit 831, a determining circuit 832 and an analog offset value adjusting circuit 833.

Referring to FIG. 8, an input terminal of the analog to digital transducer 824 is coupled to an output terminal of the first computing unit 823a of the offset value adjusting circuit 823. The ADC 824 may respectively convert the adjusted signals outputted by the first computing unit 823a into a plurality of digital data. An input terminal of the digital average calculating circuit 831 is coupled to the ADC 824. The digital average calculating circuit 831 may calculate an average value of a plurality of digital data outputted by the ADC 824 to be used as the first optical black data OB_DATA, or calculate an average value of other digital data outputted by the ADC 824 to be used as the digital data offset value D_OFFSET.

Figure 9:
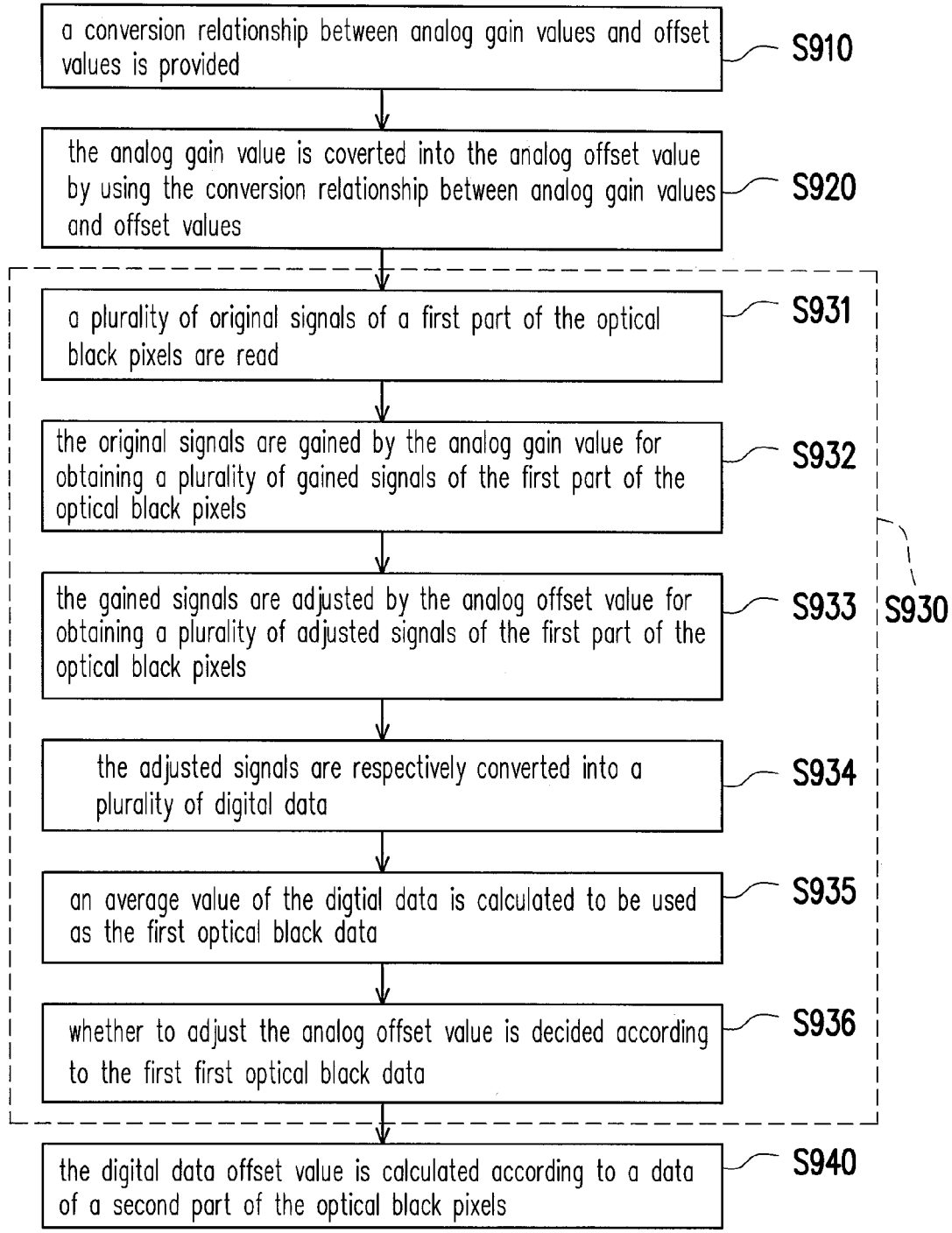
FIG. 9 is a flowchart illustrating a black level controlling method of the image sensing apparatus according to an embodiment of the invention.

FIG. 9 is a flowchart illustrating a black level controlling method of the image sensing apparatus according to another embodiment of the invention. Steps S910, S920, S930 and S940 depicted in FIG. 9 may be inferred with reference to related description for steps S310, S320, S330 and S340 depicted in FIG. 3, or may be inferred with reference to related description for steps S610, S620, S630 and S640 depicted in FIG. 6. Referring to FIG. 8 and FIG. 9, in step S910, the black level control unit 830 provides a conversion relationship between analog gain values and offset values. Next, in step S920, the black level control unit 830 converts the analog gain value G into the analog offset value A_OFFSET by using the conversion relationship between analog gain values and offset values obtained in step S910. In the present embodiment, step S930 includes sub-steps S931 to S936.

In step S931, the data sampling circuit 821 of the image data reading unit 820 reads a plurality of original signals of a first part of the optical black pixels 811. Next, in step S932, the gain circuit 822 gains the original signals of the first part outputted by the data sampling circuit 821 by the analog gain value G for obtaining a plurality of gained signals of the first part of the optical black pixels 811. On the other hand, the DAC 823b may convert the analog offset value A_OFFSET in the digital data format into the analog offset value A_OFFSET in the analog data format. In step S933, the first computing unit 823a of the offset value adjusting circuit 823 adjusts the gained signals provided by the gain circuit 822 by the analog offset value A_OFFSET in the analog form, so as to obtain a plurality of adjusted signals of the first part of the optical black pixels 811. Thereafter, in step S934, the ADC 824 respectively converts the adjusted signals provided by the first computing unit 823a into a plurality of digital data, and outputs the digital data to the digital average calculating circuit 831. In step S935, the digital average calculating circuit 831 calculates an average value of the digital data provided by the ADC 824, so as to be used as the first optical black data OB_DATA of the first part of the optical black pixels 811.

For instance, the gain circuit 822 may gain the original signals of eight optical black pixels among the optical black pixels 811 by G times to obtain eight gained signals. The first computing unit 823a may subtract the analog offset value A_OFFSET from the eight gained signals, so as to obtain eight adjusted signals. The ADC 824 may respectively convert the eight adjusted signals provided by the first computing unit 823a into eight digital data. The digital average calculating circuit 831 may calculate an average value of the eight digital data provided by the ADC 824 to be used as the first optical black data OB_DATA of the eight optical black pixels among the optical black pixels 811.

Thereafter, in step S936, the determining circuit 832 of the black level control unit 830 may decide whether to control the analog offset value adjusting circuit 833 to adjust the analog offset value A_OFFSET according to the first optical black data OB_DATA obtained. For instance, when a difference between the first optical black data OB_DATA and a target value (e.g., zero or other reference values) is greater than a specific threshold value (e.g., 20 or other reference values), the determining circuit 832 may drive the analog offset value adjusting circuit 833 to increase the analog offset value A_OFFSET. Since analog offset value A_OFFSET is increased, the next time data outputted by the image data reading unit 820 may be reduced. When the difference between the first optical black data OB_DATA and the target value is less than the threshold value, the determining circuit 832 may drive the analog offset value adjusting circuit 833 to maintain the analog offset value A_OFFSET. At this time, the black level control unit 830 has completed the rough black level calibration in the analog domain.

Once the analog offset value A_OFFSET is decided by determining circuit 832 of the black level control unit 830, the digital average calculating circuit 831 may proceed to execute step S940. In step S940, the gain circuit 822 may gain the original signals of a second part of the optical black pixels 811 by G times to obtain the gained signals of the second part of optical black pixels 811. For instance, the second part may be another eight (or other amount) of the optical black pixels, or may be other optical black pixels among the optical black pixels 811 which is not yet read. The first computing unit 823a may subtract the analog offset value A_OFFSET from the gained signals of the second part provided by the gain circuit 822 to obtain the adjusted signals of the second part. The ADC 824 may respectively convert the adjusted signals of the second part provided by the first computing unit 823a into the digital data of the second part. The digital average calculating circuit 831 may calculate the digital data offset value D_OFFSET according to the data corresponding the second part of the optical black pixels 811 in step S940. For instance, the digital average calculating circuit 831 may calculate an average value of the digital data of the second part provided by the ADC 824 to be used as the digital data offset value D_OFFSET.

After the analog offset value A_OFFSET and the digital data offset value D_OFFSET are decided by the black level control unit 830, the image data reading unit 820 may read original image data of the active pixels 812, and adjust the original image data of the active pixels 812 according to the analog gain value G and the analog offset value A_OFFSET, so as to obtain the image data ACT_DATA. The second computing unit 840 may adjust the image data ACT_DATA provided by the image data reading unit 820 according to the digital data offset value D_OFFSET provided by the digital average calculating circuit 831. For instance, the second computing unit 840 may subtract the digital data offset value D_OFFSET from the image data ACT_DATA to obtain the image data in which the black level calibration is completed. At this time, the black level control unit 830 may perform a fine black level calibration to the image data ACT_DATA in the digital domain by adjusting the digital data offset value D_OFFSET.

In view of above, it can be known that, the DAC 823b may convert the analog offset value A_OFFSET in the digital form into the analog offset value A_OFFSET in the analog form, and to be provided to the first computing unit 823a for performing the rough black level calibration in the analog domain. However, in consideration of actual situations, it is possible that the DAC 823b may generate errors. Accordingly, besides that the conversion relationship between analog gain values and offset values (e.g., shown in above-said Equation 1) may be provided in step S910, the black level control unit 830 may also provide different analog offset values A_OFFSET to the DAC 823b during the start-up calibration period for calculating a conversion ratio DAC_ratio of the DAC 823b. The image data reading unit 820 may respectively read the optical black data from different pixels among the optical black pixels 811 by using the different analog offset values A_OFFSET, and provide the optical black data of the optical black pixels 811 to the black level control unit 830 though the ADC 824. For instance, in step S910, when the black level control unit 830 sets the digital data of the analog offset value A_OFFSET to In0, the ADC 824 may output the corresponding digital optical black data being Out0. When the black level control unit 830 sets the digital data of the analog offset value A_OFFSET to In1, the ADC 824 may output the corresponding digital optical black data being Out1. Accordingly, in step S910, the black level control unit 830 may calculate the conversion ratio DAC_ratio of the DAC 823b according to an Equation 2 below.

$$DAC\_ratio=(In0-In1)/(Out0-Out1) \qquad \text{Equation 2}$$

In step S920, the black level control unit 830 may predict an initial value of the analog offset value A_OFFSET according to the analog gain value-to-offset value conversion function shown in above-said Equation 1 and the conversion ratio DAC_ratio shown in the Equation 2. For instance, in step S920, the black level control unit 830 may calculate an Equation 3 below. Therein, "pixel_V" represents an original signal/data of one specific pixel in the pixel array, "G" represents the analog gain value when "pixel_V" is read, "a" represents a slope of the Equation 1 and "b" represents an intercept of the Equation 1.

$$A\_OFFSET=(pixel\_V*G)-[(a*G+b)*DAC\_ratio] \qquad \text{Equation 3}$$

Figure 10:
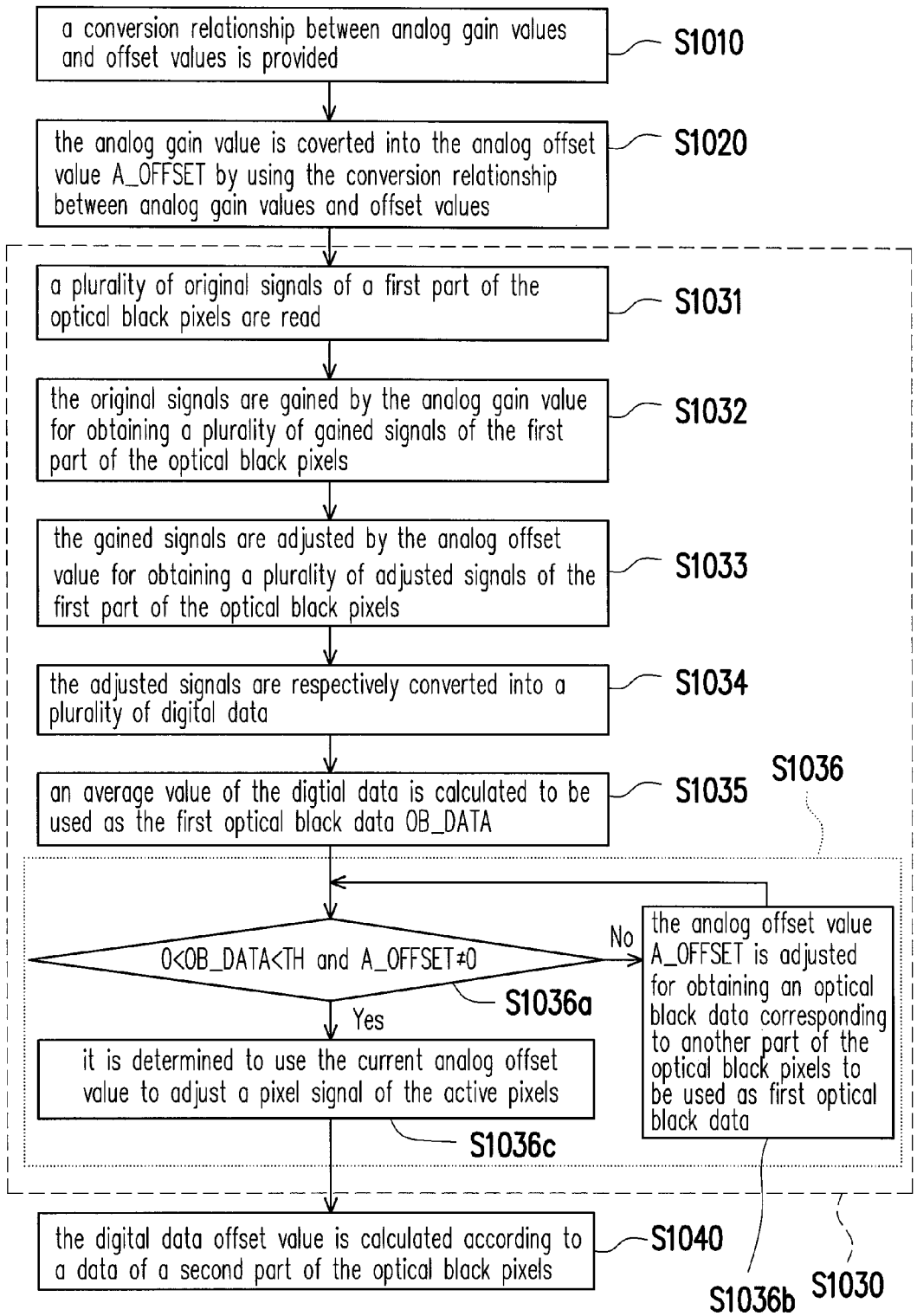
FIG. 10 is a flowchart illustrating a black level controlling method of the image sensing apparatus according to an embodiment of the invention.

FIG. 10 is a flowchart illustrating a black level controlling method of the image sensing apparatus according to yet another embodiment of the invention. Therein, steps S1010, S1020, S1030, S1031, S1032, S1033, S1034, S1035, S1036 and S1040 depicted in FIG. 10 may be inferred with reference to related description of steps S910, S920, S930, S931, S932, S933, S934, S935, S936 and S940 depicted in FIG. 9. In the present embodiment, step S1036 depicted in FIG. 10 includes sub-steps S1036a to S1036c.

Referring to FIG. 8 and FIG. 10, in step S1036a, the determining circuit 832 determines whether the first optical black data OB_DATA is within a predetermined range and whether the analog offset value A_OFFSET is zero. The predetermined range may be decided based on design requirements. For instance, the predetermined range may be set to fall between zero to an upper range value TH, and the upper range value TH is a real number. The predetermined range may be decided according to an allowable range for an input voltage of the ADC 824.

When the first optical black data OB_DATA is not within the predetermined range, or the analog offset value A_OFFSET is zero, the determining circuit 832 proceeds to execute step S1036b. In step S1036b, the determining circuit 832 may control the analog offset value adjusting circuit 833 to adjust the analog offset value A_OFFSET, such as increasing the analog offset value A_OFFSET. More specifically, in an embodiment, the analog offset value adjusting circuit 833 may adjust the analog offset value A_OFFSET by fine-tuning the analog offset value A_OFFSET according to a proportion (e.g., 5% of the analog offset value A_OFFSET). Or, in another embodiment, the analog offset value adjusting circuit 833 may also adjust the analog offset value A_OFFSET by using a fixed value/a step value to adjust the analog offset value A_OFFSET, a method for adjusting the analog offset value A_OFFSET is not particularly limited in the invention. In step S1036b, the image data reading unit 820 and the digital average calculating circuit 831 may output the optical black data OB_DATA corresponding to another part of optical black pixels 811 to the determining circuit 832 according to the analog offset value A_OFFSET being adjusted, so that the determining circuit 832 may perform the determination of step S1036a again.

When the first optical black data OB_DATA is within the predetermined range and the analog offset value A_OFFSET is not zero, the determining circuit 832 proceeds to execute step S1036c. In step S1036c, the determining circuit 832 may control the analog offset value adjusting circuit 833 to maintain the analog offset value A_OFFSET unchanged. At this time, the analog offset value adjusting circuit 833 is determined to use the current analog offset value A_OFFSET to adjust a pixel signal of the active pixels 812 in the pixel array 810. Accordingly, the image sensing apparatus 800 may perform a more accurate black level control on the analog offset value A_OFFSET in the analog domain.

For instance, the image data reading unit 820 may read original signals of thirty-two optical black pixels among the optical black pixels 811, and adjust the original signals of the thirty-two optical black pixels according to the analog gain value G and the analog offset value A_OFFSET, so as to obtain optical black data of the thirty-two optical black pixels. The digital average calculating circuit 831 calculates an average value of the optical black data of the thirty-two optical black pixels for obtaining the first optical black data OB_DATA. It is assumed herein that, the first optical black data OB_DATA corresponding to thirty-two optical black pixels is 11, and the upper range value TH of the predetermined range is set to 10. Accordingly, in step S1036a, the determining circuit 832 determines that the first optical black data OB_DATA is not within the predetermined range, thus step S1036b is executed. In step S1036b, the analog offset value adjusting circuit 833 may increase the analog offset value A_OFFSET, such as increasing the analog offset value A_OFFSET by 5%. In step S1036b, the image data reading unit 820 may adjust the original signals of another thirty-two optical black pixels among the optical black pixel 811 according to the increased analog gain value G and the increased analog offset value A_OFFSET, so as to obtain the optical black data of the another thirty-two optical black pixels. In step S1036b, the digital average calculating circuit 831 calculates an average value of the optical black data of the another thirty-two optical black pixels for obtaining a new first optical black data OB_DATA. Steps S1036a and S1036b are executed repeatedly until the first optical black data OB_DATA is within the predetermined range. When the determining circuit 832 determines that the first optical black data OB_DATA is within the predetermined range, the analog offset value adjusting circuit 833 is determined to perform the black level control in the analog domain by using the analog offset value A_OFFSET at this time.

As another example, the image data reading unit 820 may adjust the original signals of thirty-two optical black pixels among the optical black pixel 811 according to the analog gain value G and the analog offset value A_OFFSET, so as to obtain the optical black data of the thirty-two optical black pixels. The digital average calculating circuit 831 calculates an average value of the optical black data of the thirty-two optical black pixels for obtaining the first optical black data OB_DATA. It is assumed herein that, the first optical black data OB_DATA corresponding to the thirty-two optical black pixels is less than 0, and a lower range value of the predetermined range is set to 0. Accordingly, in step S1036a, the determining circuit 832 determines that the first optical black data OB_DATA is not within the predetermined range, thus step S1036b is executed. In step S1036b, the analog offset value adjusting circuit 833 may decrease the analog offset value A_OFFSET, such as decreasing the analog offset value A_OFFSET by 5%. In step S1036b, the image data reading unit 820 may adjust the original signals of another thirty-two optical black pixels among the optical black pixel 811 according to the decreased analog gain value G and the decreased analog offset value A_OFFSET, so as to obtain the optical black data of the another thirty-two optical black pixels. In step S1036b, the digital average calculating circuit 831 calculates an average value of the optical black data of the another thirty-two optical black pixels for obtaining a new first optical black data OB_DATA. Steps S1036a and S1036b are executed repeatedly until the first optical black data OB_DATA is within the predetermined range.

It should be noted that, in an embodiment, in case the first optical black data OB_DATA read by the image data reading unit 820 is zero, in order to prevent the black level from being overly adjusted, the analog offset value adjusting circuit 833 may slightly decrease the analog offset value A_OFFSET (e.g., decreasing the original analog offset value A_OFFSET by 5%). Meanwhile, the image data reading unit 820 and the digital average calculating circuit 831 may provide the first optical black data OB_DATA that is within the predetermined range to the determining circuit 832 according to the adjusted analog offset value A_OFFSET. At this time, the black level control unit 830 has completed the adjustment for the analog offset value A_OFFSET.

In the present embodiment, the determining circuit 832 may perform the determination by using a comparator. A type of the comparator being used or circuits or element having similar functions are not particularly limited in the invention. The analog offset value adjusting circuit 833 may be realized by using, for example, a multiplier or an adder, or a combined circuit having similar computing capabilities. Herein, types and implementations of circuits for adjusting the analog offset value A_OFFSET are not limited in the invention.

Figure 11A:
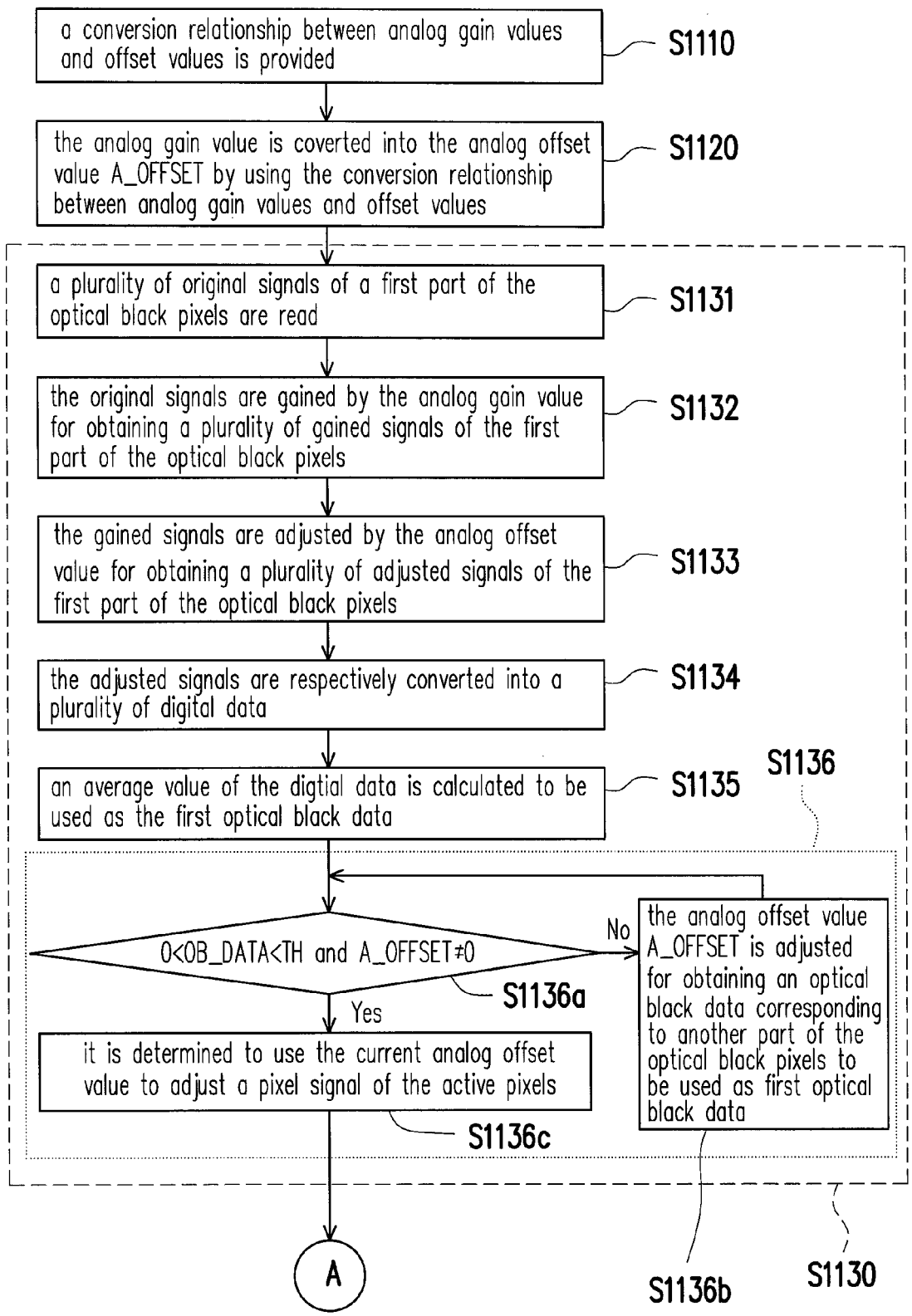
FIG. 11A and FIG. 11B are a flowchart illustrating a black level controlling method of the image sensing apparatus according to an embodiment of the invention.
Figure 11B:
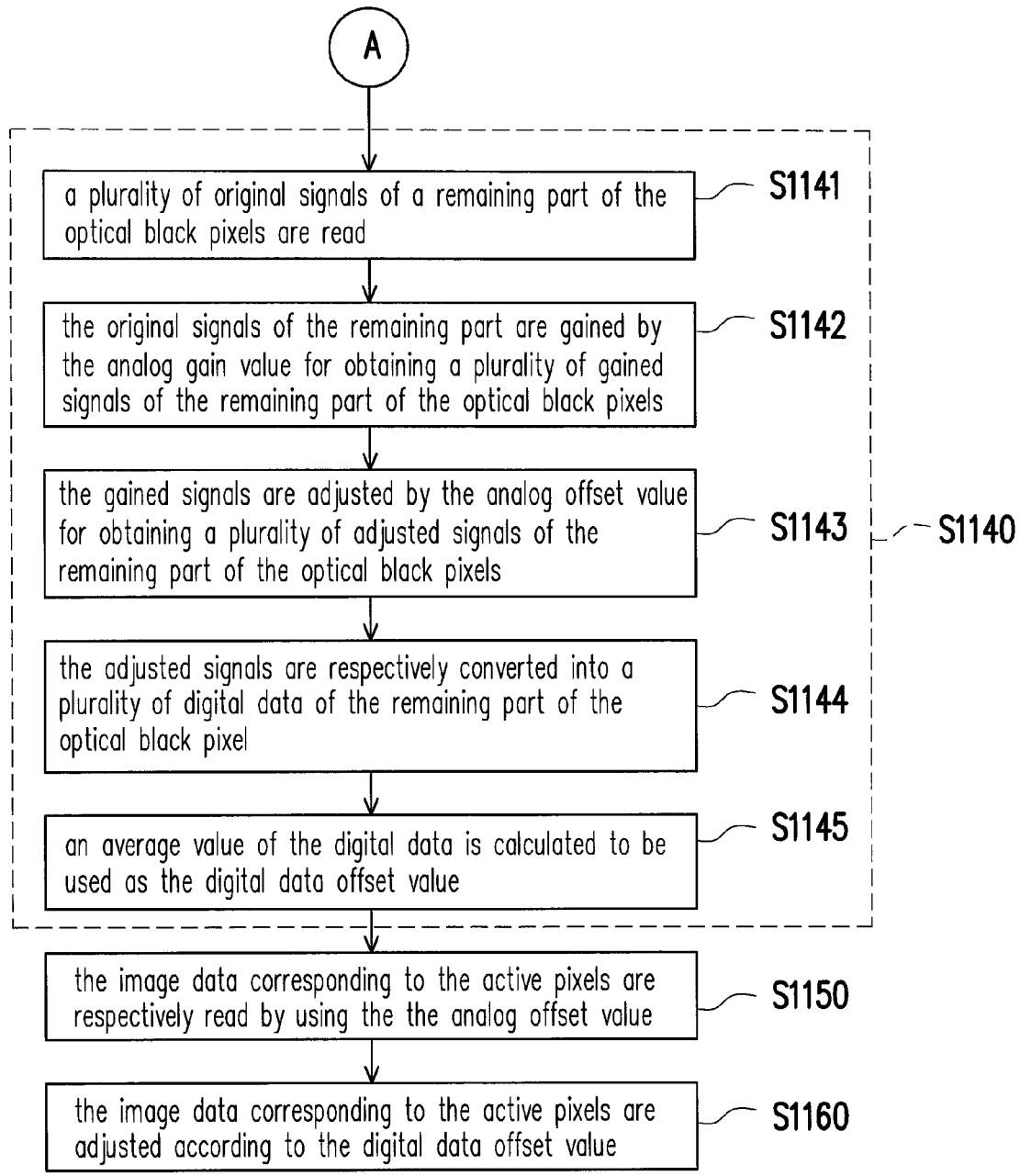

FIG. 11A and FIG. 11B are a flowchart illustrating a black level controlling method of the image sensing apparatus according to yet another embodiment of the invention. Therein, steps S1110, S1120, S1130, S1131, S1132, S1133, S1134, S1135, S1136, S1136a, S1136b, S1136c and S1140 as depicted in FIG. 11A and FIG. 11B may be inferred with reference to related description of steps S1010, S1020, S1030, S1031, S1032, S1033, S1034, S1035, S1036, S1036a, S1036b, S1036c and S1040 as depicted in FIG. 10. In FIG. 11A and FIG. 11B, step S1140 includes sub-steps S1141 to S1145.

Referring to FIG. 8, FIG. 11A and FIG. 11B, as described above, a part of the pixel array 811 is used/read for adjusting the analog offset value A_OFFSET in step S1130. After the analog offset value A_OFFSET for adjusting an image signal is determined by the analog offset value adjusting circuit 833 of the black level control unit 830 in step S1136c, the image sensing apparatus 800 may proceed to execute step S1141. In step S1141, the data sampling circuit 821 reads a plurality of original signals of a remaining part of the optical black pixels 811. Next, in step S1142, the gain circuit 822 gains the original signals of the remaining part by the analog gain value G for obtaining a plurality of gained signals of the remaining part of the optical black pixels 811. In step S1143, the first computing unit 823a may adjust the gained signals outputted by the gain circuit 822 by the analog offset value A_OFFSET which is adjusted in step S1130, so as to obtain a plurality of adjusted signals of the remaining part of the optical black pixels 811. Therein, the adjusted analog offset value A_OFFSET may first be converted from the digital form into the analog form through the DAC 823b before being provided to the first computing unit 823a. Thereafter, in step S1144, the ADC 824 respectively converts the adjusted signals outputted by the first computing unit 823a into a plurality of digital data of the remaining part of the optical black pixel 811. In step S1145, the digital average calculating circuit 831 calculates an average value of the digital data to be used as the digital data offset value D_OFFSET.

After the adjusted analog offset value A_OFFSET and the adjusted digital data offset value D_OFFSET are obtained, the image sensing apparatus 800 may use them to adjust the black level of the image data ACT_DATA of the active pixels 812. For instance, in step S1150, the image data reading unit 820 respectively reads the image data ACT_DATA corresponding to the active pixels 812 by using the analog gain value G and the analog offset value A_OFFSET. Subsequently, in step S1160, the black level control unit 830 transmits the digital data offset value D_OFFSET to the second computing unit 840, and the second computing unit 840 adjusts the image data ACT_DATA corresponding to the active pixels 812 according to the digital data offset value D_OFFSET. For instance, in an embodiment, the second computing unit 840 (e.g., the subtracter) may subtract the digital data offset value D_OFFSET from the image data ACT_DATA, so as to remove parts having black level signals from the image data ACT_DATA for obtaining a more preferable image data to be outputted. In other embodiment, the image sensing apparatus 800 may also realize said subtraction for the image data and the digital data offset value D_OFFSET by using other circuits, and types of the circuits for realizing said subtraction are not limited in the invention.

Accordingly, by using the black level controlling method as proposed in above embodiments of the invention, the image sensing apparatus is capable of obtaining the analog offset value A_OFFSET and the corresponding digital data offset value D_OFFSET. The analog offset value A_OFFSET may be used to perform the rough black level calibration on the image data ACT_DATA of the active pixels in the analog domain. The digital data offset value D_OFFSET may be used to perform the fine black level calibration on the image data ACT_DATA of the active pixels in the digital domain. In view of above, the black level controlling method and the image sensing apparatus proposed by the foregoing embodiments may realize a more accurate black level control.

Figure 12:
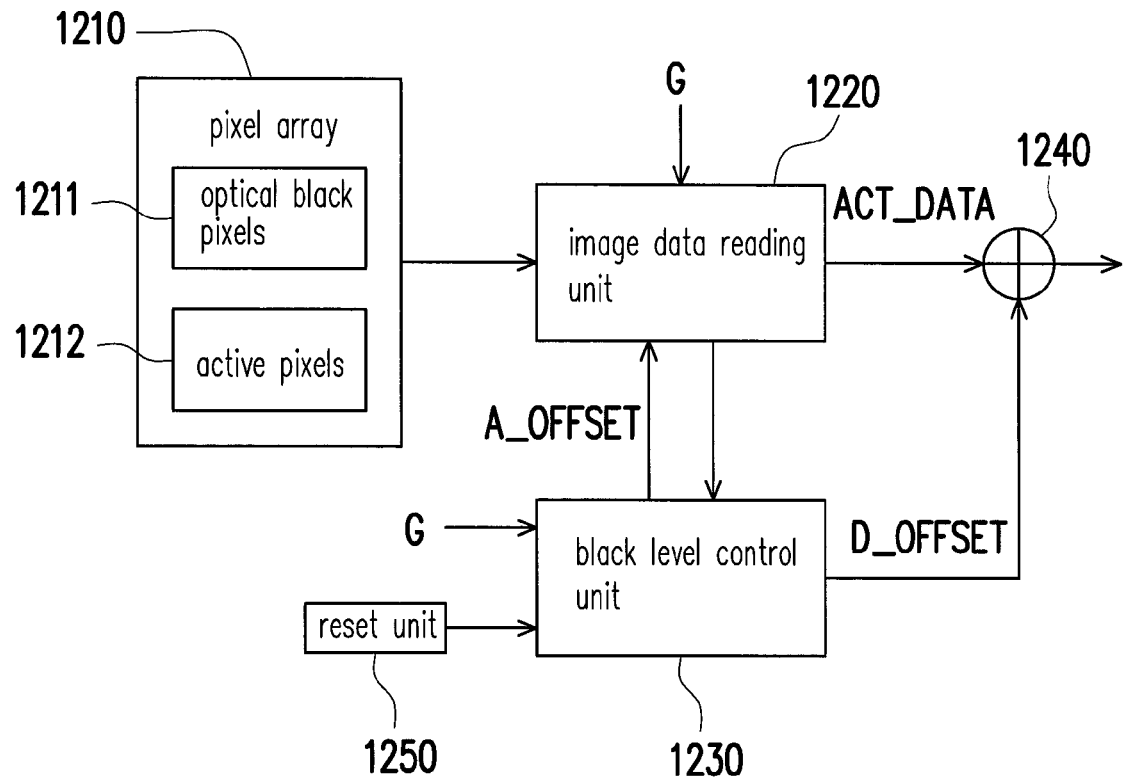
FIG. 12 is a schematic circuit block diagram illustrating an image sensing apparatus according to an embodiment of the invention.

In some other embodiments, the image sensing apparatus may further include a reset unit for adjusting the offset value correspondingly in time when the analog gain value G is changed, so as to realize a more accurate dynamic black level control. For instance, FIG. 12 is a schematic circuit block diagram illustrating an image sensing apparatus according to still another embodiment of the invention. An image sensing apparatus 1200 depicted in FIG. 12 includes a pixel array 1210, an image data reading unit 1220 and a black level control unit 1230, a second computing unit 1240 and a reset unit 1250. The pixel array 1210 includes optical black pixels 1211 and active pixels 1212. The image sensing apparatus 1200, the pixel array 1210, the optical black pixels 1211, the active pixels 1212, the image data reading unit 1220, the black level control unit 1230 and the second computing unit 1240 as depicted in FIG. 12 may be inferred with reference to related description for the image sensing apparatus 800, the pixel array 810, the optical black pixels 811, the active pixels 812, the image data reading unit 820, the black level control unit 830 and the second computing unit 840 as depicted in FIG. 8. Unlike the embodiment depicted in FIG. 8, the image sensing apparatus 1200 in the embodiment of FIG. 12 further includes the reset unit 1250. The reset unit 1250 is coupled to the black level control unit 1230.

Figure 13A:
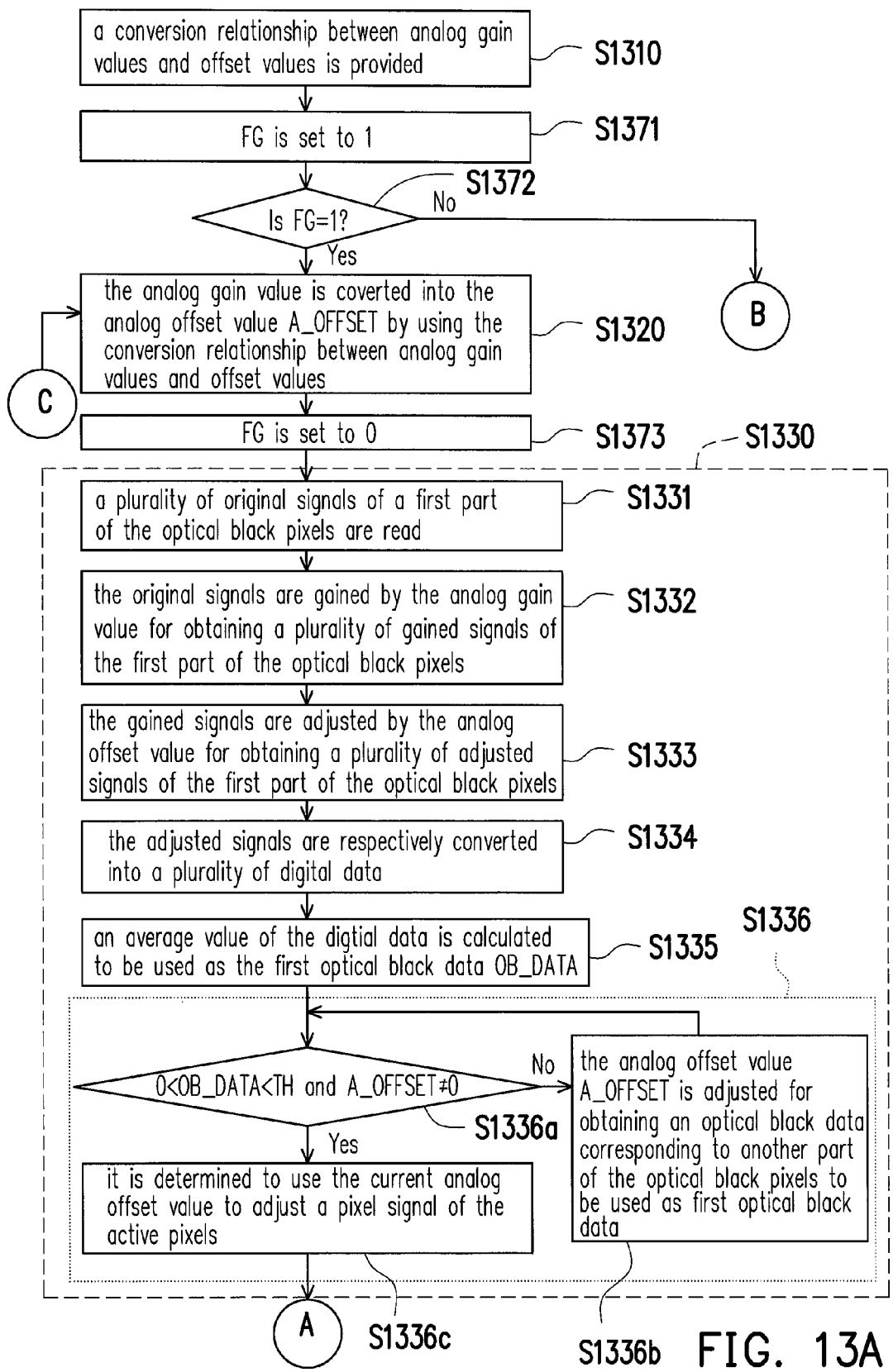
FIG. 13A and FIG. 13B are a flowchart illustrating a black level controlling method of the image sensing apparatus according to an embodiment of the invention.
Figure 13B:
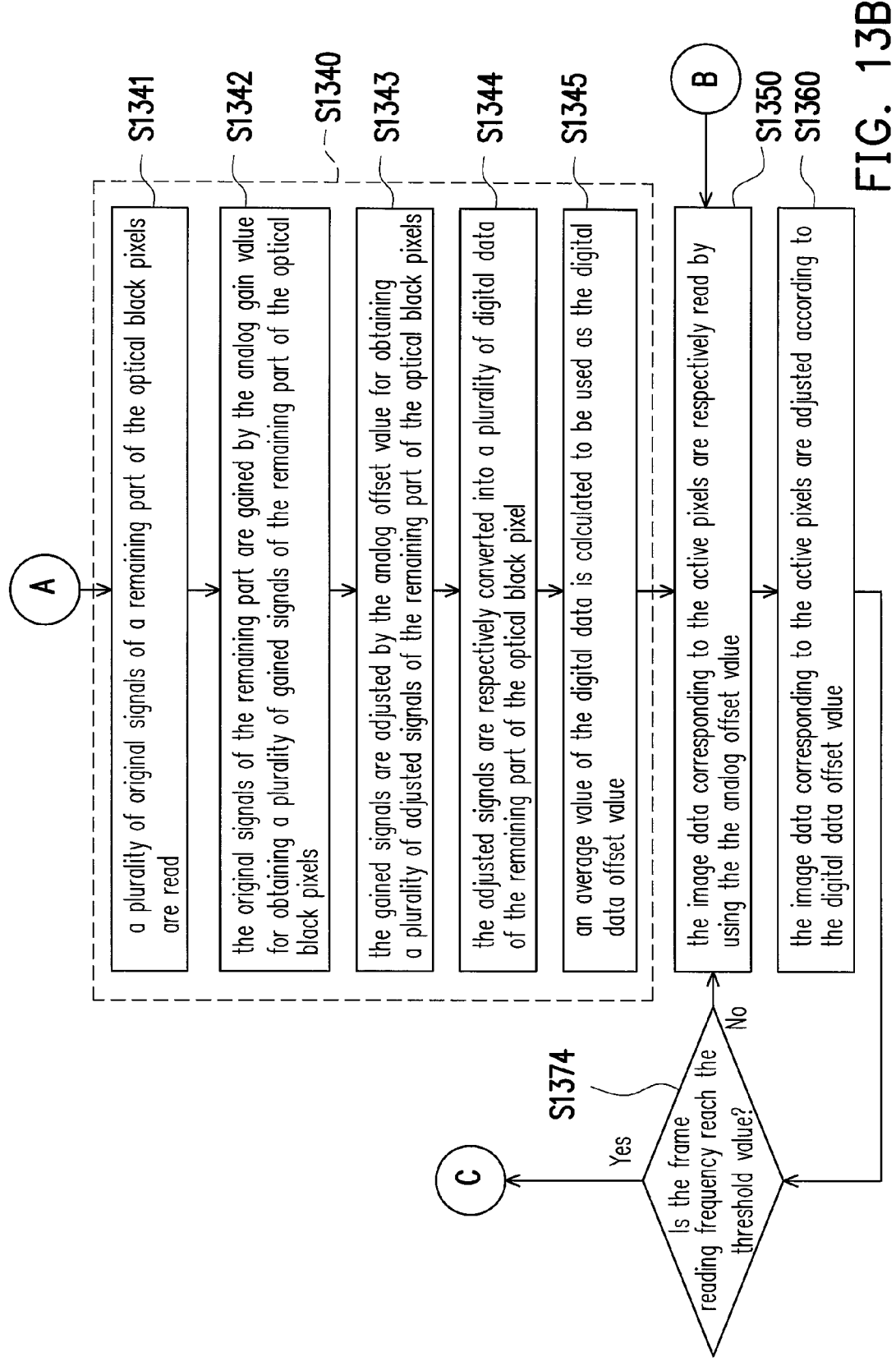

FIG. 13A and FIG. 13B are a flowchart illustrating a black level controlling method of the image sensing apparatus according to yet another embodiment of the invention. Therein, steps S1310, S1320, S1330, S1331, S1332, S1333, S1334, S1335, S1336, S1336a, S1336b, S1336c, S1340, S1341, S1342, S1343, S1344, S1345, S1350 and S1360 as depicted in FIG. 13A and FIG. 13B may be inferred with reference to related description of steps S1110, S1120, S1130, S1131, S1132, S1133, S1134, S1135, S1136, S1136a, S1136b, S1136c, S1140, S1141, S1142, S1143, S1144, S1145, S1150 and S1160 as depicted in FIG. 11A and FIG. 11B. In FIG. 13A and FIG. 11B, steps S1371 to S1374 are further included.

Referring to FIG. 12, FIG. 13A and FIG. 13B, after the conversion relationship between analog gain values and offset values is provided by the black level control unit 1230 in step S1310, the reset unit 1250 may determine whether to adjust the analog offset value A_OFFSET and the digital data offset value D_OFFSET by utilizing a flag FG. For instance, when the reset unit 1250 detects that the analog gain value G is changed, the reset value 1250 may set the flag FG to 1, so as to trigger the black level control unit 1230 to adjust the analog offset value A_OFFSET and the digital data offset value D_OFFSET. When the reset unit 250 detects that the analog gain value G is not changed, the flag FG may be set to zero, so that the black level control unit 1230 maintains the current analog offset value A_OFFSET and the current digital data offset value D_OFFSET. A method for setting the flag FG is not particularly limited in the invention.

In step S1371, the reset unit 1250 sets the flag FG to an initial value (e.g., the initial value being 1). In step S1372, the black level control unit 1230 determines whether the flag FG is 1. When the reset unit 1250 determines that the flag FG is 1, the reset unit 1250 may trigger the black level control unit 1230 to covert the analog gain value G into the analog offset value A_OFFSET (step S1320), and then steps S1330 and S1340 are executed to obtain the analog offset value A_OFFSET and the digital data offset value D_OFFSET. Accordingly, after a system is initialized, the black level control unit 1230 may adjust the analog offset value A_OFFSET and the digital data offset value D_OFFSET in step S1371, so that the image sensing apparatus 1200 may obtain the analog offset value A_OFFSET and the digital data offset value after startup for the first time. After the analog offset value A_OFFSET and the digital data offset value D_OFFSET are obtained, the black level control unit 1230 may adjust the black level of the image data ACT_DATA of the active pixels 1212.

It should be noted that, when the reset unit 250 determines/detects that the analog gain value G is changed, the reset value 1250 may set the flag FG to 1, so as to trigger the black level control unit 1230 to adjust the analog offset value A_OFFSET and the digital data offset value D_OFFSET once again (i.e., steps S1320, S1330 and S1340). During a period for adjusting the analog offset value A_OFFSET and the digital data offset value D_OFFSET, the black level control unit 1230 may set the flag FG to zero (step S1373), so as to reduce a frequency for adjusting the analog offset value A_OFFSET and the digital data offset value D_OFFSET.

In case the flag FG is zero, it indicates that the analog gain value G is not changed, thus the image sensing apparatus 1200 does not need to adjust the analog offset value A_OFFSET and the digital data offset value D_OFFSET again. Therefore, when it determined that the flag FG is zero in step S1372, the image sensing apparatus 1200 skips steps S1320, S1330 and S1340 and proceeds to execute steps S1350 and S1360. In steps S1350 and S1360, the image sensing apparatus 1200 adjusts the black level of the sensing data of the active pixels 1212 by using the determined analog offset value A_OFFSET and the determined digital data offset value D_OFFSET respectively in the analog domain and the digital domain, so as to obtain the image data ACT_DATA corresponding to the active pixels 1212.

After step S1360 is completed, the reset unit 1250 may also calculate a frequency for reading image frames of the pixel array 1210 by the image sensing apparatus 1200, and determine whether said frequency reaches a threshold value (step S1374). When the frequency is not yet reached the threshold value, the image sensing apparatus 1200 may skip steps S1320, S1330 and S1340 (i.e., the analog offset value A_OFFSET and the digital data offset value D_OFFSET are maintained unchanged), and proceed to execute steps S1350 and S1360. When it is determined that the frequency reaches the threshold value in step S1374, the reset value 1250 may further set the flag FG to 1, so as to trigger the black level control unit 1230 to adjust the analog offset value A_OFFSET and the digital data offset value D_OFFSET once again (i.e., steps S1320, S1330 and S1340). Therefore, the image sensing apparatus 1200 is capable of dynamically adjusting the analog offset value A_OFFSET and the digital data offset value D_OFFSET correspondingly for each time interval according to the analog gain value G at the time. Accordingly, the noises from the dark current increased due to rise of temperature caused by the image sensing apparatus 1200 used for a long period of time may be avoided, so as to realize the more accurate dynamic black level control. In other words, a possible temperature variation may be reflected by a frame-reading frequency in the present embodiment, such that influences of the temperature variation to the accuracy of the back level control may be eliminated. The reset unit 1250 of the present embodiment may include a counter for calculating the frame-reading frequency, and a comparator for comparing the threshold value with the frequency counted by the counter, so as to determine whether the frame-reading frequency reaches a frequency threshold value. In another embodiment, the frame-reading frequency may also be determined in a manner of counting by countdowns. For instance, the image sensing apparatus 1200 may be preset to re-converting the current analog gain value G into the analog offset value A_OFFSET for each time 10 images are read, so as to realize a reset function of the present embodiment.

A method for implementing step S1374 depicted in FIG. 13A and FIG. 13B is not particularly limited by the present embodiment. For instance, in other embodiments, the reset unit 1350 may replace the frame-reading frequency by a time period in step S1374. In other words, in step S1374, the reset unit 1350 may count the time period started from the last time the analog offset value A_OFFSET and the digital data offset value D_OFFSET are adjusted unit now, and determine whether the time period counted reaches a time threshold value. When the reset unit 1250 determines that the time period counted is not yet reached the time threshold value, the image sensing apparatus 1200 may maintain analog offset value A_OFFSET and the digital data offset value D_OFFSET unchanged, and proceed to execute steps S1350 and S1360. When the reset unit 1250 determines that the time period counted reaches the time threshold value, the reset value 1250 may set the flag FG to 1, so as to trigger the black level control unit 1230 to adjust the analog offset value A_OFFSET and the digital data offset value D_OFFSET once again (i.e., steps S1320, S1373, S1330 and S1340).

Figure 14:
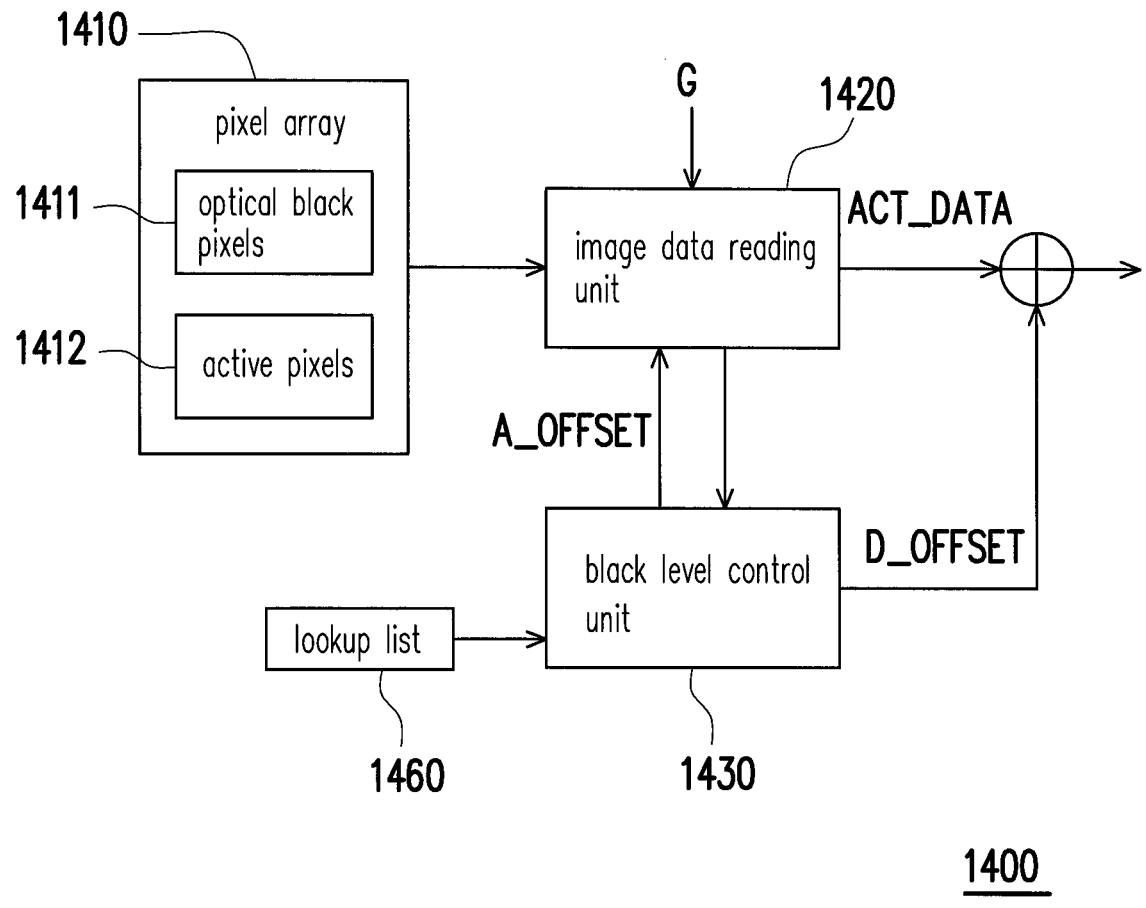
FIG. 14 is a schematic circuit block diagram illustrating an image sensing apparatus according to an embodiment of the invention.

Moreover, in some embodiments, the image sensing apparatus may further include a lookup table/list, and the conversion relationship between analog gain values and offset values obtained in step S1310 is recorded in the lookup table. Accordingly, the black level control unit may directly gain access to the conversion relationship between analog gain values and offset values through the lookup table. For instance, FIG. 14 is a schematic circuit block diagram illustrating an image sensing apparatus according to still another embodiment of the invention. In the present embodiment, an image sensing apparatus 1400 includes a pixel array 1410, an image data reading unit 1420 and a black level control unit 1430 and a lookup table 1460. The image sensing apparatus 1400, the pixel array 1410, the optical black pixels 1411, the active pixels 1412, the image data reading unit 1420 and the black level control unit 1430 as depicted in FIG. 14 may be inferred with reference to related description for the image sensing apparatus 100, the pixel array 110, the optical black pixels 111, the active pixels 112, the image data reading unit 120 and the black level control unit 130 as depicted in FIG. 1. Referring to FIG. 14, in the present embodiment, the lookup table 1460 is stored in a storage unit of the image sensing apparatus 1400. The conversion relationship between analog gain values and offset values is recorded in the lookup table 1460. The black level control unit 1430 converts the analog gain value G into the analog offset value A_OFFSET by using the conversion relationship between analog gain values and offset values in the lookup table, so as realize the black level control.

In summary, the image sensing apparatus and the black level controlling method thereof according to embodiments of the invention are capable of obtaining the conversion relationship between analog gain values and offset values during the start-up calibration period, or obtaining the conversion relationship between analog gain values and offset values from the lookup table. According to the conversion relationship between analog gain values and offset values, the black level control unit may convert the analog gain value G into the corresponding analog offset value A_OFFSET. Furthermore, in the embodiments of the invention, the optical black data of the optical black pixels are used to decide whether to adjust the analog offset value A_OFFSET and calculate the digital data offset value D_OFFSET, so that the accurate black level control may be performed. Accordingly, the image sensing apparatus and the black level controlling method thereof according to the embodiments of the invention may effectively adjust the analog offset value A_OFFSET and the digital data offset value D_OFFSET by utilizing the optical black area. In case the analog gain value G is changed or the noises from the dark current are changed due to the temperature variation, the image sensing apparatus and the black level controlling method thereof according to the embodiments of the invention may provide a reset function to dynamically adjust the analog offset value A_OFFSET and the digital data offset value D_OFFSET in time for obtaining a more preferable image data to be outputted.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A black level controlling method of an image sensing apparatus at least having a pixel array which includes a plurality of optical black pixels and a plurality of active pixels, and the black level controlling method comprising:
   providing a conversion relationship between analog gain values and offset values;
   converting an analog gain value into an analog offset value by using the conversion relationship between analog gain values and offset values;
   deciding whether to adjust the analog offset value according to a first optical black data corresponding to a first part of the optical black pixels; and
   calculating a digital data offset value according to a data corresponding a second part of the optical black pixels,
   wherein deciding whether to adjust the analog offset value comprises:
   a. determining whether the first optical black data is within a predetermined range and whether the analog offset value is zero; and
   b. adjusting the analog offset value when the first optical black data is not within the predetermined range or the analog offset value is zero, obtaining optical black data corresponding to another part of the optical black pixels according to the adjusted analog offset value to be used as the first optical black data, and repeating the step a again.

2. The black level controlling method of claim 1, wherein providing the conversion relationship between analog gain values and offset values comprises:
   respectively reading a plurality of sensing data of the optical black pixels by using different analog gain values for obtaining the conversion relationship between analog gain values and offset values during a start-up calibration period.

3. The black level controlling method of claim 2, wherein respectively reading the sensing data of the optical black pixels for obtaining the conversion relationship between analog gain values and offset values comprises:
   respectively reading the sensing data of the optical black pixels by using the different analog gain values during the start-up calibration period; and
   analyzing the analog gain values and the sensing data of the optical back pixels by using a linear regression thereby obtaining an analog gain value-to-offset value conversion function to be used as the conversion relationship between analog gain values and offset values.

4. The black level controlling method of claim 2, wherein respectively reading the sensing data of the optical black pixels for obtaining the conversion relationship between analog gain values and offset values comprises:
   respectively reading the sensing data of the optical black pixels by using the different analog gain values during the start-up calibration period;
   analyzing the analog gain values and the sensing data of the optical back pixels by using a linear regression thereby obtaining an analog gain value-to-offset value conversion function;
   respectively reading the sensing data of the optical black pixels by using different offset values for calculating a conversion ratio; and
   obtaining the conversion relationship between analog gain values and offset values according the analog gain value-to-offset value conversion function and the conversion ratio.

5. The black level controlling method of claim 4, wherein obtaining the conversion relationship between analog gain values and offset values according the analog gain value-to-offset value conversion function and the conversion ratio comprises:
calculating a product of the analog gain value-to-offset value conversion function and the conversion ratio to be used as the conversion relationship between analog gain values and offset values.

6. The black level controlling method of claim 1, wherein providing the conversion relationship between analog gain values and offset values comprises:
providing a lookup table, wherein the conversion relationship between analog gain values and offset values is recorded in the lookup table.

7. The black level controlling method of claim 1, wherein converting the analog gain value into the analog offset value comprises:
deciding the analog gain value according to a photosensitivity of a frame being previewed; and
converting the analog gain value into the analog offset value by using the conversion relationship between analog gain values and offset values.

8. The black level controlling method of claim 1, wherein deciding whether to adjust the analog offset value comprises:
reading an original signal of an optical black pixel among the optical black pixels;
gaining the original signal by the analog gain value for obtaining a gained signal of the optical black pixel;
adjusting the gained signal by the analog offset value for obtaining the first optical black data; and
deciding whether to adjust the analog offset value according to the first optical black data.

9. The black level controlling method of claim 1, wherein deciding whether to adjust the analog offset value comprises:
reading a plurality of original signals of the first part of the optical black pixels;
gaining the original signals by the analog gain value for obtaining a plurality of gained signals of the first part of the optical black pixels;
adjusting the gained signals by the analog offset value for obtaining a plurality of adjusted signals of the first part of the optical black pixels;
respectively converting the adjusted signals into a plurality of digital data;
calculating an average value of the plurality of digital data to be used as the first optical black data; and
deciding whether to adjust the analog offset value according to the first optical black data.

10. The black level controlling method of claim 1, wherein deciding whether to adjust the analog offset value further comprises:
determining to adjust a pixel signal of the pixel array by the analog offset value when the first optical black data is within the predetermined range and the analog offset value is not zero.

11. The black level controlling method of claim 1, wherein calculating the digital data offset value comprises:
reading a plurality of original signals of a remaining part of the optical black pixels when the first optical black data is within the predetermined range and the analog offset value is not zero;
gaining the original signals of the remaining part by the analog gain value for obtaining a plurality of gained signals of the remaining part of the optical black pixels;
adjusting the gained signals of the remaining part by the analog offset value for obtaining a plurality of adjusted signals of the remaining part of the optical black pixels;
respectively converting the adjusted signals of the remaining part into a plurality of digital data of the remaining part of the optical black pixels; and
calculating an average value of the plurality of digital data of the remaining part to be used as the digital data offset value.

12. The black level controlling method of claim 1, further comprising:
respectively reading image data corresponding to the active pixels by using the analog offset value; and
adjusting the image data corresponding to the active pixels according to the digital data offset value.

13. The black level controlling method of claim 1, wherein converting the analog gain value into the analog offset value by using the conversion relationship between analog gain values and offset values comprises:
determining whether the analog gain value is changed; and
when the analog gain value is changed, converting the analog gain value into the analog offset value by re-using the conversion relationship between analog gain values and offset values.

14. The black level controlling method of claim 1, wherein converting the analog gain value into the analog offset value by using the conversion relationship between analog gain values and offset values comprises:
determining whether a frame-reading frequency reaches a frequency threshold value; and
when the frame-reading frequency reaches the frequency threshold value, converting the analog gain value into the analog offset value by re-using the conversion relationship between analog gain values and offset values.

15. The black level controlling method of claim 1, wherein the conversion relationship between analog gain values and offset values comprises a linear equation in two variables, or a polynomial of other powers or a combination thereof.

16. An image sensing apparatus, comprising:
at least one pixel array comprising a plurality of optical black pixels and a plurality of active pixels;
an image data reading unit coupled to the pixel array, wherein the image data reading unit receives an output of the pixel array, and outputs image data corresponding to the pixel array according to an analog gain value and an analog offset value; and
a black level control unit coupled to the image data reading unit, wherein the black level control unit provides a conversion relationship between analog gain values and offset values, converts the analog gain value into the analog offset value by using the conversion relationship between analog gain values and offset values, decides whether to adjust the analog offset value according to a first optical black data corresponding to a first part of the optical black pixels, and calculates a digital data offset value according to a data corresponding a second part of the optical black pixels,
wherein the black level control unit outputs the analog offset value to the image data reading unit, and adjusts the image data outputted by the image data reading unit according to the digital data offset value,
wherein the black level control unit comprises:
a digital average calculating circuit coupled to the image data reading unit for converting the optical black data outputted by the image data reading unit into the first optical black data;
a determining circuit coupled to the digital average calculating circuit for receiving the first optical black data, wherein the determining circuit determines whether the first optical black data is within a predetermined range and whether the analog offset value is zero; and an analog offset value adjusting circuit coupled to the determining circuit and the image data reading unit, wherein the analog offset value adjusting circuit adjusts the analog offset value when the determining circuit determines that the first optical black data is not within the predetermined range or the analog offset value is zero, and the image data reading unit obtains optical black data corresponding to another part of the optical black pixels according to the analog offset value.

17. The image sensing apparatus of claim 16, wherein the black level control unit respectively reads a plurality of sensing data of the optical black pixels by using different analog gain values for obtaining the conversion relationship between analog gain values and offset values during a start-up calibration period.

18. The image sensing apparatus of claim 17, wherein the black level control unit respectively reads the sensing data of the optical black pixels by using the different analog gain values during the start-up calibration period, and analyzes the analog gain values and the sensing data of the optical back pixels by using a linear regression thereby obtaining an analog gain value-to-offset value conversion function to be used as the conversion relationship between analog gain values and offset values.

19. The image sensing apparatus of claim 17, wherein the black level control unit respectively reads the sensing data of the optical black pixels by using the different analog gain values during the start-up calibration period, analyzes the analog gain values and the sensing data of the optical back pixels by using a linear regression thereby obtaining an analog gain value-to-offset value conversion function, respectively reads the sensing data of the optical black pixels by using different offset values for calculating a conversion ratio, and obtains the conversion relationship between analog gain values and offset values according the analog gain value-to-offset value conversion function and the conversion ratio.

20. The image sensing apparatus of claim 19, wherein the black level control unit calculates a product of the analog gain value-to-offset value conversion function and the conversion ratio to be used as the conversion relationship between analog gain values and offset values.

21. The image sensing apparatus of claim 16, wherein the image sensing apparatus further comprises:
a lookup table, wherein the conversion relationship between analog gain values and offset values is recorded in the lookup table.

22. The image sensing apparatus of claim 16, wherein the image data reading unit decides the analog gain value according to a photosensitivity of a frame being previewed, and the black level control unit converts the analog gain value into the analog offset value by using the conversion relationship between analog gain values and offset values.

23. The image sensing apparatus of claim 16, wherein the image data reading unit comprises:
a data sampling circuit coupled to the pixel array, wherein the data sampling circuit receives the output of the pixel array for obtaining an original signal;
a gain circuit coupled to the data sampling circuit for receiving the original signal, wherein the gain circuit gains the original signal according to the analog gain value for obtaining a gained signal; and
an offset value adjusting circuit coupled to the gain circuit for receiving the gained signal, wherein the offset value adjusting circuit adjusts the gained signal according to the analog offset value for outputting an adjusted signal.

24. The image sensing apparatus of claim 23, wherein the data sampling circuit reads the original signal of an optical black pixel among the optical black pixels; the gain circuit gains the original signal of the optical black pixel by the analog gain value for obtaining the gained signal of the optical black pixel; and the offset value adjusting circuit adjusts the gained signal of the optical black pixel by the analog offset value for obtaining the first optical black data.

25. The image sensing apparatus of claim 23, wherein the image data reading unit further comprises:
an analog to digital converter coupled to the offset value adjusting circuit.

26. The image sensing apparatus of claim 25, wherein the digital average calculating circuit coupled to the analog to digital converter;
wherein the data sampling circuit reads a plurality of original signals of the first part of the optical black pixels; the gain circuit gains the original signals of the first part by the analog gain value for obtaining a plurality of gained signals of the first part of the optical black pixels; the offset value adjusting circuit adjusts the gained signals of the first part by the analog offset value for obtaining a plurality of adjusted signals of the first part of the optical black pixels; the analog to digital converter respectively converts the adjusted signals of the first part into a plurality of digital data; and the digital average calculating circuit calculates an average value of the plurality of digital data to be used as the first optical black data.

27. The image sensing apparatus of claim 16, wherein the analog offset value adjusting circuit is determined to adjust a pixel signal of the pixel array by the analog offset value when the determining circuit determines that the first optical black data is within the predetermined range and the analog offset value is not zero.

28. The image sensing apparatus of claim 16, wherein the image data reading unit respectively reads the image data corresponding to the active pixels according to the analog offset value, and the black level control unit adjusts the image data corresponding to the active pixels according to the digital data offset value.

29. The image sensing apparatus of claim 16, wherein the image sensing apparatus further comprises:
a reset unit coupled to the black level control unit, wherein the reset unit determines whether the analog gain value is changed, and when the reset unit determines that analog gain value is changed, the reset unit triggers the black level control unit to convert the analog gain value into the analog offset value by re-using the conversion relationship between analog gain values and offset values.

30. An image sensing apparatus, comprising:
at least one pixel array comprising a plurality of optical black pixels and a plurality of active pixels;
an image data reading unit coupled to the pixel array, wherein the image data reading unit receives an output of the pixel array, and outputs image data corresponding to the pixel array according to an analog gain value and an analog offset value;
a black level control unit coupled to the image data reading unit, wherein the black level control unit provides a conversion relationship between analog gain values and offset values, converts the analog gain value into the analog offset value by using the conversion relationship between analog gain values and offset values, decides whether to adjust the analog offset value according to a first optical black data corresponding to a first part of the optical black pixels, and calculates a digital data offset value according to a data corresponding a second part of the optical black pixels, wherein the black level control unit outputs the analog offset value to the image data reading unit, and adjusts the image data outputted by the image data reading unit according to the digital data offset value; and a reset unit coupled to the black level control unit, wherein the reset unit determines whether a frame-reading frequency reaches a frequency threshold value, and when the reset unit determines that the frame-reading frequency reaches the frequency threshold value, the resetting unit triggers the black level control unit to convert the analog gain value into the analog offset value by re-using the conversion relationship between analog gain values and offset values.

31. The image sensing apparatus of claim 16, wherein the conversion relationship between analog gain values and offset values comprises a linear equation in two variables, or a polynomial of other powers or a combination thereof.

* * * * *